(12) United States Patent
Brundage et al.

(10) Patent No.: US 9,014,162 B2
(45) Date of Patent: *Apr. 21, 2015

(54) WIRELESS LOCAL AREA NETWORK-BASED POSITION LOCATING SYSTEMS AND METHODS

(71) Applicant: Digimarc Corporation, Beaverton, OR (US)

(72) Inventors: Trent J. Brundage, Sherwood, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/903,709

(22) Filed: May 28, 2013

(65) Prior Publication Data

US 2014/0036894 A1    Feb. 6, 2014

Related U.S. Application Data

(63) Continuation of application No. 12/429,030, filed on Apr. 23, 2009, now Pat. No. 8,451,763, which is a continuation-in-part of application No. 12/355,436, filed on Jan. 16, 2009, now Pat. No. 7,876,266, which (Continued)

(51) Int. Cl.
*H04W 4/00* (2009.01)
*H04W 64/00* (2009.01)
*G01S 5/02* (2010.01)

(52) U.S. Cl.
CPC ........... *H04W 64/003* (2013.01); *G01S 5/0289* (2013.01); *H04W 64/00* (2013.01)

(58) Field of Classification Search
CPC ..... G01S 5/0289; H04W 64/00; H04W 64/003
USPC .......................................... 370/312, 328, 338
See application file for complete search history.

(56) References Cited

U.S. PATENT DOCUMENTS

| 4,193,073 A | 3/1980 | Kohnen |
| 4,405,986 A | 9/1983 | Gray |

(Continued)

OTHER PUBLICATIONS

Enge, P. et al., "Special Issue on Global Positioning System," Proceedings of the IEEE, vol. 87(1), p. 3-15, Jan. 1999.

(Continued)

*Primary Examiner* — Andrew Lai
*Assistant Examiner* — Albert Shih
(74) *Attorney, Agent, or Firm* — Digimarc Corporation

(57) ABSTRACT

The location of one or more mobile nodes in a wireless local area network (WLAN) is determined. Nodes in the WLAN include respective ping drivers to generate ping event values related to transmit count stamps and receive count stamps for wireless messages exchanged between the nodes. Each wireless message is associated with a transmit offset corresponding to an expected transmit time. A sorting module groups the ping event values and produces a difference between the respective receive count stamps and the transmit count stamps for each wireless message. Based on the sorted ping event values, the sorting module generates transmit offset values relating to the transmit offsets. A space-time calibration unit generates, from the sorted differences and the transmit offset values, a clock rate solution and a location solution for at least one of the nodes in the WLAN.

18 Claims, 11 Drawing Sheets

Related U.S. Application Data is a continuation of application No. PCT/US2007/025172, filed on Dec. 7, 2007.

(60) Provisional application No. 60/873,891, filed on Dec. 7, 2006.

(56) References Cited

U.S. PATENT DOCUMENTS

| | | | |
|---|---|---|---|
| 5,045,861 | A | 9/1991 | Duffett-Smith |
| 5,838,279 | A | 11/1998 | Duffett-Smith et al. |
| 6,084,547 | A | 7/2000 | Sanderford et al. |
| 6,094,168 | A | 7/2000 | Duffett-Smith et al. |
| 6,167,275 | A | 12/2000 | Oros et al. |
| 6,275,705 | B1 | 8/2001 | Drane et al. |
| 6,529,165 | B1 | 3/2003 | Duffett-Smith et al. |
| 6,650,877 | B1 | 11/2003 | Tarbouriech et al. |
| 6,694,142 | B1 | 2/2004 | Kuwahara et al. |
| 6,806,830 | B2 | 10/2004 | Panasik et al. |
| 6,894,644 | B2 | 5/2005 | Duffett-Smith et al. |
| 7,224,984 | B2 | 5/2007 | Agrawala et al. |
| 7,260,407 | B2 | 8/2007 | Duffett-Smith et al. |
| 7,315,745 | B2 | 1/2008 | Duffett-Smith et al. |
| 7,359,719 | B1 | 4/2008 | Duffett-Smith et al. |
| 7,382,804 | B2 | 6/2008 | Alapuranen et al. |
| 7,508,883 | B2 | 3/2009 | Duffett-Smith et al. |
| 7,593,736 | B1 | 9/2009 | Duffett-Smith et al. |
| 7,826,837 | B1 | 11/2010 | Sylvester |
| 7,876,266 | B2 | 1/2011 | Rhoads |
| 7,983,185 | B2 | 7/2011 | Rhoads et al. |
| 8,451,763 | B2 * | 5/2013 | Brundage et al. ............ 370/312 |
| 2001/0004601 | A1 | 6/2001 | Drane et al. |
| 2003/0001776 | A1 | 1/2003 | Hannah et al. |
| 2003/0054838 | A1 | 3/2003 | Carrez |
| 2003/0080902 | A1 | 5/2003 | Roberts |
| 2003/0119524 | A1 | 6/2003 | Carlsson |
| 2003/0220117 | A1 | 11/2003 | Duffett-Smith et al. |
| 2004/0002344 | A1 | 1/2004 | Moeglein et al. |
| 2004/0046693 | A1 | 3/2004 | Ogino et al. |
| 2004/0137915 | A1 | 7/2004 | Diener et al. |
| 2005/0137786 | A1 | 6/2005 | Breed et al. |
| 2007/0001903 | A1 | 1/2007 | Smith et al. |
| 2007/0066231 | A1 | 3/2007 | Duffett-Smith et al. |
| 2007/0200759 | A1 | 8/2007 | Heidari-Bateni et al. |
| 2007/0247368 | A1 | 10/2007 | Wu |
| 2009/0061899 | A1 | 3/2009 | Hwang et al. |
| 2009/0073030 | A1 | 3/2009 | Hansen et al. |
| 2009/0111482 | A1 | 4/2009 | Rowe et al. |
| 2009/0213828 | A1 | 8/2009 | Brundage et al. |
| 2009/0233621 | A1 | 9/2009 | Rhoads et al. |
| 2009/0273518 | A1 | 11/2009 | Duffet-Smith et al. |
| 2009/0281729 | A1 | 11/2009 | Duffett-Smith et al. |
| 2010/0045531 | A1 | 2/2010 | Rhoads |
| 2010/0135178 | A1 | 6/2010 | Aggarwal et al. |
| 2010/0202300 | A1 | 8/2010 | Rhoads et al. |
| 2013/0316728 | A1 | 11/2013 | Bradley |

OTHER PUBLICATIONS

Braasch, M.S. et al., "GPS Receiver Architectures and Measurement," Proceedings of the IEEE, vol. 87(1), p. 48-64, Jan. 1999.

Misra, P. et al., "GPS Performance in Navigation," Proceedings of the IEEE, vol. 87(1), p. 65-85, Jan. 1999.

GPS Joint Program Office, "Navstar GPS Space Segment/Navigation User Interfaces," Navstar Global Positioning System, Interface Specification, IS-GPS-200, Revision D., ARINC Engineering Services, LLC, Dec. 7, 2004.

US. Joint Planning and Development Office (JPDO), Air Navigation Services Working Group, "FAA's Surveillance/Positioning Backup Strategy Alternatives Analysis." Paper No. 08-003, Jul. 15, 2008.

US. Federal Aviation Administration, "Fact Sheet—NextGen." Feb. 14, 2007, available at <<http://www.faa.gov/news/fact.sub.--sheets/news.sub.--story.cfm?ne- wsID=8145>>.

Notice of Allowance and Issue Fee Due dated Jul. 25, 2012 in U.S. Appl. No. 12/426,787.

Examiner's Answer dated Jul. 24, 2012 in U.S. Appl. No. 12/373,944.

H. Feng et al., Positioning models and systems based on digital television broadcasting signals, Frontiers of Electrical and Electronic Engineering in China, vol. 2(4), p. 410-414, 2007.

Ciurana et al, "A Ranging Method With IEEE 802.11 Data Frames for Indoor Localization", WCNC 2007 proceedings.

Bahillo et al., "Indoor Location Based on IEEE 802.11 Round-Trip Time Measurements With Two-Step NLOS Mitigation", Progress in Electromagnetics Research B, vol. 15, 285-306, 2009.

U.S. Appl. No. 61/116,996, filed Nov. 21, 2008.

Office Action dated Nov. 28, 2014, in U.S. Appl. No. 13/833,679.

* cited by examiner

400 → Pingcast

| Node 1 | Node 2 | Node 3 | Node 4 | Node 5 | Node 6 |
|---|---|---|---|---|---|
| $Count_{TX1}$ | $Count_{RX1.2}$ | $Count_{RX1.3}$ | $Count_{RX1.4}$ | $Count_{RX1.5}$ | $Count_{RX1.6}$ |

FIG. 4

500 → Pingset

| Pingcast | Node 1 | Node 2 | Node 3 | Node 4 | Node 5 | Node 6 |
|---|---|---|---|---|---|---|
| 1 | $Count_{TX1}$ | $Count_{RX1.2}$ | $Count_{RX1.3}$ | $Count_{RX1.4}$ | $Count_{RX1.5}$ | $Count_{RX1.6}$ |
| 2 | $Count_{RX2.1}$ | $Count_{TX2}$ | $Count_{RX2.3}$ | $Count_{RX2.4}$ | $Count_{RX2.5}$ | $Count_{RX2.6}$ |
| 3 | $Count_{RX3.1}$ | $Count_{RX3.2}$ | $Count_{TX3}$ | $Count_{RX3.4}$ | $Count_{RX3.5}$ | $Count_{RX3.6}$ |
| 4 | $Count_{RX4.1}$ | $Count_{RX4.2}$ | $Count_{RX4.3}$ | $Count_{TX4}$ | $Count_{RX4.5}$ | $Count_{RX4.6}$ |
| 5 | $Count_{RX5.1}$ | $Count_{RX5.2}$ | $Count_{RX5.3}$ | $Count_{RX5.4}$ | $Count_{TX5}$ | $Count_{RX5.6}$ |
| 6 | $Count_{RX6.1}$ | $Count_{RX6.2}$ | $Count_{RX6.3}$ | $Count_{RX6.4}$ | $Count_{RX6.5}$ | $Count_{TX6}$ |

| Row # | Tx.Rx | D1 | D2 | D3 | Off2$_0$ | Off2$_N$ | Off3$_0$ | Off3$_N$ |
|---|---|---|---|---|---|---|---|---|
| 1 | 1.2 | 0 | 1 | 0 | 1-dev$_1$[1] | dev$_1$[1] | 0 | 0 |
| 2 | 1.2 | 0 | 1 | 0 | 1-1/N-dev$_1$[2] | dev$_1$[2]+1/N | 0 | 0 |
| ... | ... | ... | ... | ... | ... | ... | ... | ... |
| N | 1.2 | 0 | 1 | 0 | 1-(N-1)/N-dev$_1$[N] | dev$_1$[N]+(N-1)/N | 0 | 0 |
| N+1 | 1.3 | 0 | 0 | 1 | 0 | 0 | 1-dev$_1$[1] | dev$_1$[1] |
| ... | ... | ... | ... | ... | ... | ... | ... | ... |
| 2N | 1.3 | 0 | 0 | 1 | 0 | 0 | 1-(N-1)/N-dev$_1$[N] | dev$_1$[N]+(N-1)/N |
| 2N+1 | 2.1 | 1 | 0 | 0 | -(1-dev$_2$[1]) | -(dev$_2$[1]) | 0 | 0 |
| ... | ... | ... | ... | ... | ... | ... | ... | ... |
| 3N | 2.1 | 1 | 0 | 0 | -(1-(N-1)/N-dev$_2$[N]) | -(dev$_2$[N]+(N-1)/N) | 0 | 0 |
| 3N+1 | 2.3 | 0 | 0 | 1 | -(1-dev$_2$[1]) | -(dev$_2$[1]) | 1-dev$_2$[1] | dev$_2$[1] |
| ... | ... | ... | ... | ... | ... | ... | ... | ... |
| 4N | 2.3 | 0 | 0 | 1 | -(1-(N-1)/N-dev$_2$[N]) | -(dev$_2$[N]+(N-1)/N) | 1-(N-1)/N-dev$_2$[N] | dev$_2$[N]+(N-1)/N |
| ... | ... | ... | ... | ... | ... | ... | ... | ... |
| 5N+1 | 3.2 | 0 | 1 | 0 | 1-dev$_3$[1] | dev$_3$[1] | -(1-dev$_3$[1]) | -(dev$_3$[1]) |
| ... | ... | ... | ... | ... | ... | ... | ... | ... |
| 6N | 3.2 | 0 | 1 | 0 | 1-(N-1)/N-dev$_3$[N] | dev$_3$[N]+(N-1)/N | -(1-(N-1)/N-dev$_3$[N]) | -(dev$_3$[N]+(N-1)/N) |

FIG. 11

WIRELESS LOCAL AREA NETWORK-BASED POSITION LOCATING SYSTEMS AND METHODS

RELATED APPLICATION

This application is a continuation of U.S. patent application Ser. No. 12/429,030, filed Apr. 23, 2009 (U.S. Pat. No. 8,451,763), which is a continuation-in-part of U.S. patent application Ser. No. 12/355,436, filed Jan. 16, 2009 (now U.S. Pat. No. 7,876,266), which is a continuation of International Application No. PCT/US2007/025172, filed Dec. 7, 2007, which claims benefit of U.S. Provisional Patent Application No. 60/873,891, filed Dec. 7, 2006, each of which are hereby incorporated herein in their entirety.

TECHNICAL FIELD

This disclosure is related to object positioning systems. More particularly, this disclosure is related to determining a space-time solution for a wireless node in a Wi-Fi network based on data exchanged between the network nodes.

BACKGROUND INFORMATION

Generally, a wireless local area network (WLAN) includes a plurality fixed and mobile devices configured to communicate with one another using radios. Such WLANs may be referred to, for example, as Wi-Fi networks. Further, such WLANs may use an IEEE 802.11 communication protocol (e.g., 802.11a, 802.11b. 802.11g, 802.11n). Artisans will recognize from the disclosure herein that other protocols for wireless and/or wired communications may also be used.

Current techniques for determining a location of a mobile device in a WLAN include using a Global Positioning System (GPS), Wi-Fi Time Difference of Arrival (TDOA), and Wireless Access Point Wardriving.

In addition to providing navigation within the urban core, GPS is widely used to aid navigation worldwide. GPS was originally designed as a military system and has had recent broad adoption for civil and civilian uses due to its inherent accuracy and a strong history of reliable performance. Several other entities, including the European Union, Russia, India, China, and Japan have satellite-based Position, Navigation, and Timing. Collectively, the use of satellite-based navigation services is referred to a Global Navigation Satellite Systems (GNSS). GPS, however, remains the de facto system of choice, primarily because of its maturity, with over fifteen years of reliable free service. GPS acceptance has also been enhanced by open interface control documentation (ICD), which allows receiver manufacturers to confidently design systems against a reliable standard.

Because GNSS systems are satellite-based, however, there is a danger that either natural or human threats to these systems could make them vulnerable to outages. Further, other locating systems may not provide a desired level of accuracy or may be overly expensive.

SUMMARY OF THE DISCLOSURE

Space-time solutions are determined by exchanging ping transmit events among nodes in a WLAN to produce ping event values. The ping event values are accumulated and sorted based on ping events that occur within a predetermined time period. After sorting, clock solutions and location solutions are determined based at least in part on transmit offset values. Transmit and receive delays are tracked over time to generate more precise positioning solutions.

In one embodiment, a method for determining location and timing information in a WLAN includes generating ping event values corresponding to ping events related to transmit count stamps and receive count stamps for wireless messages exchanged between nodes in the WLAN. A wireless messages is associated with a transmit offset that corresponds to an expected transmit time. The ping event values are sorted according to multiple ones of the ping events that occur within a first predetermined time period. The method includes producing a difference between the respective receive count stamps and the transmit count stamps for each wireless message. The method also includes generating, from the sorted differences, a clock rate solution and a location solution for at least one of the nodes in the WLAN.

Each node includes a receive delay corresponding to a difference between a first time at which the node records a receive count stamp corresponding to a particular wireless message and a second time at which the particular wireless message is received at an antenna of the receiving node. Generating the clock rate solution and the location solution may further include generating receive delay values, based on the sorted differences, relating to the receive delays for each of the nodes.

In another embodiment, a system for determining location and timing information in WLAN includes a plurality of nodes that communicate wirelessly through the WLAN. Each node includes a respective ping driver to generate ping event values corresponding to ping events related to transmit count stamps and receive count stamps for wireless messages exchanged between the nodes in the WLAN. The system also includes a sorting module to sort the ping event values corresponding to multiple ones of the ping events that occur within a first predetermined time period. The sorting module produces a difference between the respective receive count stamps and the transmit count stamps for each wireless message. The sorting module also generates transmit offset values. The system further includes a space-time calibration unit to generate, from the sorted differences and the transmit offset values, a clock rate solution and a location solution for at least one of the nodes in the WLAN.

Additional aspects and advantages will be apparent from the following detailed description of preferred embodiments, which proceeds with reference to the accompanying drawings.

BRIEF DESCRIPTION OF THE DRAWINGS

FIG. 4 graphically illustrates a table representing a pingcast according to one embodiment.

FIG. 5 graphically illustrates a table representing a pingset according to one embodiment.

FIG. 11 graphically illustrates the H matrix structure according to one embodiment.

DETAILED DESCRIPTION OF PREFERRED EMBODIMENTS

Figure 1:
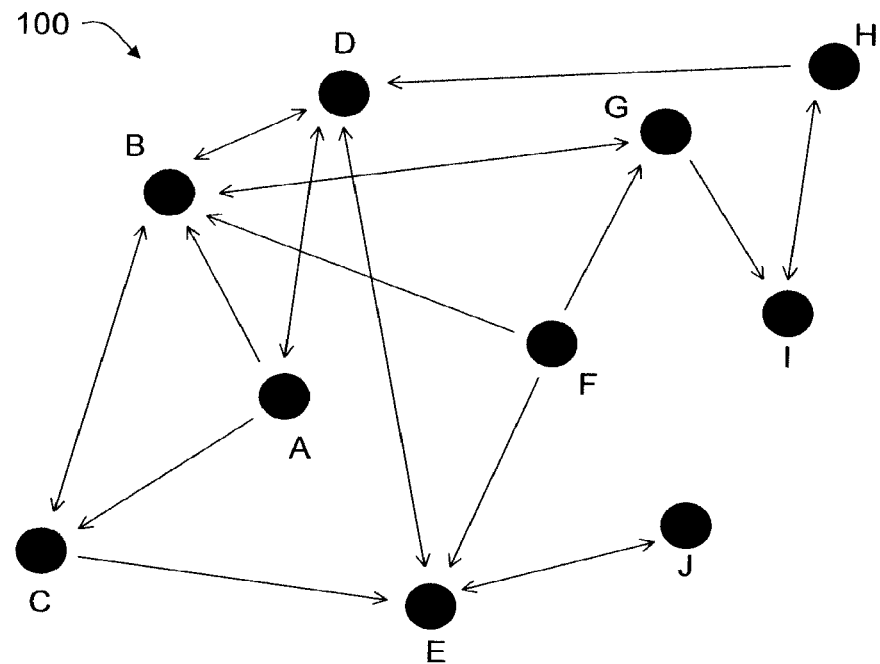
FIG. 1 illustrates a network of nodes according to one embodiment.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

A. Overview

A precision timing/location technology referred to as "PhaseNet" is described in International Patent Application Publication No. WO/2008/073347, filed Dec. 7, 2007, by Geoffrey Rhoads (the "Rhoads application"), which is assigned to the assignee of the present application. As discussed in detail below, in general, the PhaseNet algorithms run on the nodes of a network, and messages passed between the nodes serve as input to the algorithms. Each node includes an independent, free-running clock that runs at its own rate with respect to a common network system time. In one embodiment, the common network system time is defined as an average of the node clocks within the system. Artisans will recognize from the disclosure herein that many other system clock determination techniques are possible. For example, if one of the system nodes operates with an atomic clock, that clock can establish the system clock with extremely small clock drift.

In operation, enough information is accumulated from the nodes to solve the PhaseNet algorithms to determine a particular node's location with respect to the other nodes and to determine corrections to the particular node's internal clock rate with respect to the overall system clock rate. A skilled artisan will recognize from the disclosure herein that the embodiments herein may be used to track a single node's location or to track the location of multiple nodes in the network.

FIG. 1 illustrates a network 100 that includes ten nodes A, B, C, D, E, F, G, H, I, J according to one embodiment. The network 100 may include different numbers of nodes and nodes may be added to or removed from the network 100 at any time. In this example, it is assumed that some of the nodes move with respect to the other nodes. For example, some of the nodes may be handheld mobile devices or laptop computers. Lines between nodes represent communication links (either a duplex link or a monoplex link). For simplicity, FIG. 1 does not show lines between each node. However, it is assumed that each node may establish duplex or monoplex communication with any of the other nodes. Further, while the nodes in FIG. 1 are illustrated as being located in a two-dimensional plane, an artisan will recognize from the disclosure herein that nodes may be distributed in a three-dimensional space.

As discussed in detail below, the PhaseNet algorithms exploit at least two aspects of wireless networks. The first aspect is that, by nature, the nodes A, B, C, D, E, F, G, H, I, J in the network 100 are configured to pass messages between one another. The second aspect of the network 100 used by the PhaseNet algorithms is that, as discussed below, each node A, B, C, D, E, F, G, H, I, J has a local clock that may be used to count stamp the sending and receiving of messages.

In the general case, the messages passed between two network nodes take the form of pings and pungs. A ping transmit event includes a time stamped message from one node to another. The sending node appends to the message the value of its counter at the instant the message is transmitted. The receiving node then takes note of the value of its own counter when the message is received. The data resulting from a ping event includes, most basically, of a pair of count values. The first count is the clock value of the sending node when the ping transmit event was sent, and the second count is the clock value of a receiving node when it received the ping transmit event. The term pung is used to refer to any data communication between nodes of the network, such as sharing the data resulting from ping events, which is not itself a ping event. The general PhaseNet algorithms take the data resulting from ping events and pungs and use it to solve for timing and/or location information useful for the nodes A, B, C, D, E, F, G, H, I, J of the network 100. The specific form of this information is application dependent.

Figure 2:
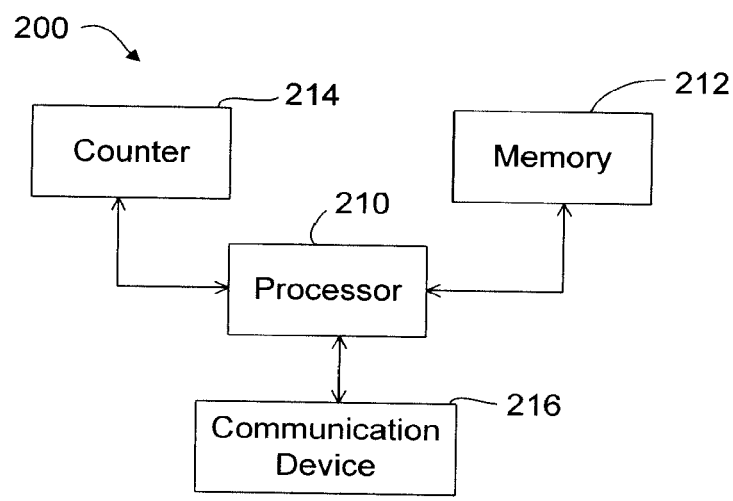
FIG. 2 is a block diagram of a node according to one embodiment.

FIG. 2 is a block diagram of a node 200 according to one embodiment. The node 200 shown in FIG. 2 may correspond, for example, to one or more of the nodes A, B, C, D, E, F, G, H, I, J shown in FIG. 1. The node 200 includes a processor 210 in communication with a memory device 212, a counter 214, and a communication device 216. The processor 210 may include, for example, digital signal processors, one or more field-programmable gate array (FPGA), general purpose single-chip or multi-chip microprocessors, special purpose processors, combinations of the foregoing, or the like. The memory device 212 may include, for example, random access memory (RAM), hard drives, drives that accept hard or floppy disks, tape cassettes, CD-ROM, DVD-ROM, or other computer-readable storage media. The memory device 212 includes program instructions that are executable by the processor 210 for determining space-time solutions as described herein. The memory device 212 may also include one or more databases (not shown) for storing data used to calculate the space-time solutions.

The communication device 216 is configured to provide communication with other nodes. In certain embodiments, the communication device 216 also provides an interface to other timing/location systems such as a GPS device. As discussed above, the communication device 216 in certain embodiments is configured to wirelessly communicate with a WLAN. An artisan will recognize from the disclosure herein that many different communication networks and/or protocols may be used depending on the particular application.

In one embodiment, the counter 214 is driven by a low cost digital clock (not shown). The counter 214 may have at least a 64-bit counting range. In one embodiment, the counter 214 is capable of running at approximately 1 million counts per second. The counter 214 may be built using cascades of counters, with 8 or 16-bit counters running at the highest speed, and driving lower rate 64-bit counters, for example. Of course, an artisan will recognize from the disclosure herein that many other configurations may also be used. Given that PhaseNet solutions ultimately solve for count-rate variability between nodes, their quality may be commensurate with extremely low-cost parts and very basic performance specifications.

In certain example embodiments provided herein, the network includes a WLAN and the nodes include a plurality fixed and mobile devices configured to communicate with each other through the WLAN. Artisans will recognize from the disclosure herein that other protocols for wireless and/or wired communications may also be used. As provided by the IEEE 802.11 standard, the WLAN according to certain embodiments disclosed herein may be configured in an infrastructure mode or in an Ad Hoc mode. In infrastructure mode, a mobile device accesses the network and communicates with other mobile devices through an access point (AP). In Ad Hoc mode, the mobile nodes communicate with each other directly. Example embodiments for both infrastructure and Ad Hoc configurations are provided below.

B. Example Wi-Fi Embodiments Using Infrastructure Mode

Figure 3:
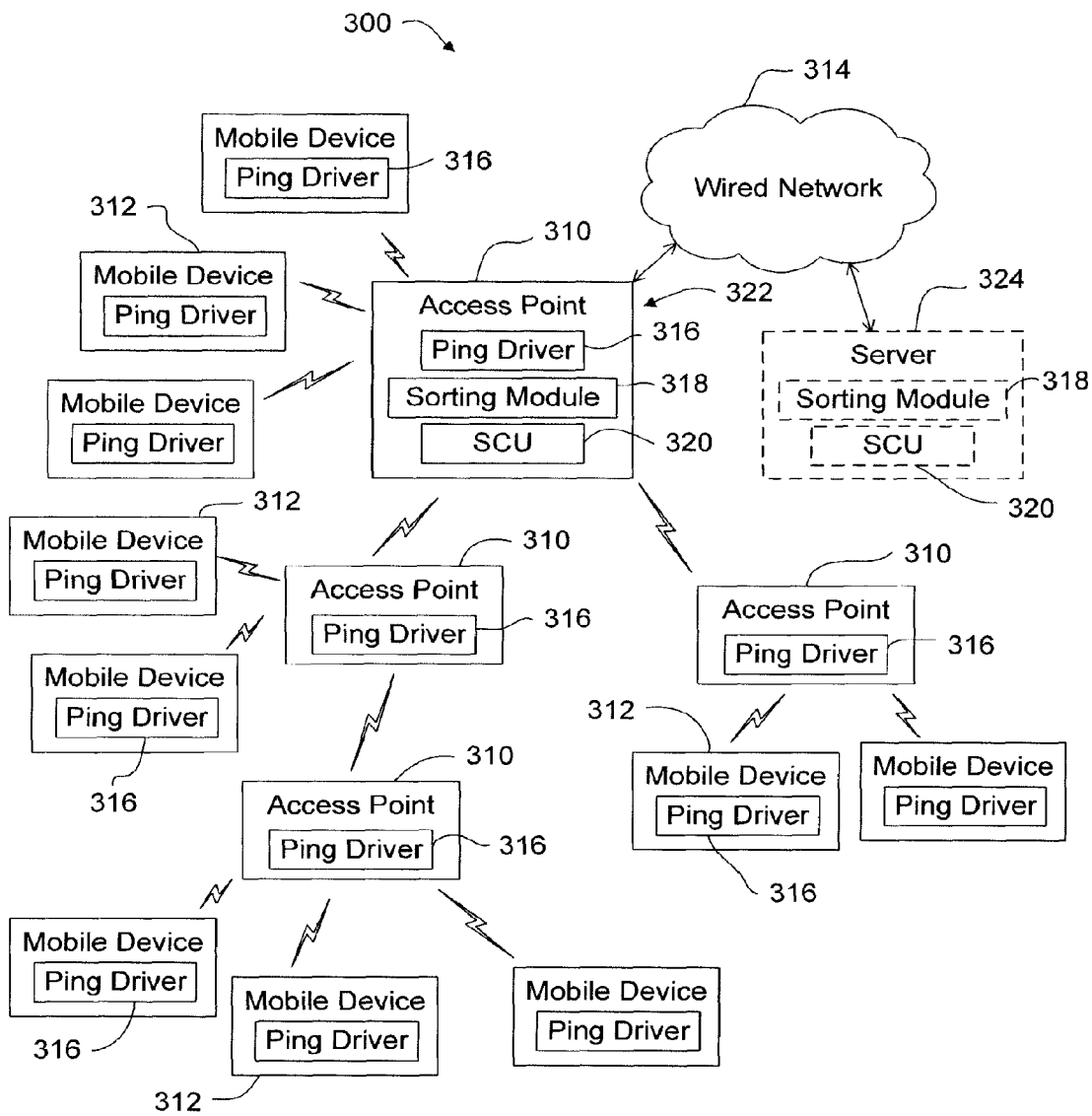
FIG. 3 is a block diagram of a WLAN operating in an infrastructure mode according to one embodiment.

FIG. 3 is a block diagram of a WLAN 300 operating in an infrastructure mode according to one embodiment. The WLAN 300 may include a plurality of access points 310 (four shown) that are each configured to provide, for example, a bridge, transponder, gateway, and/or firewall between mobile devices 312 (ten shown) and a wired network 314. As shown in FIG. 3, one access point 310 may communicate directly with the wired network 314 to provide a bridge between a wireless and wired LAN and through which the mobile devices 312 may communicate with the Internet. The mobile devices 312 may include, for example, handheld mobile devices or laptop computers.

Each node (e.g., each access point 310 and each mobile device 312) includes a ping driver 316 for producing ping transmit events and ping receive events. In certain embodiments, each node (regardless of whether it is an access point 310 or a mobile device 312) produces ping transmit events and ping receive events by operating simultaneously in both an AP mode and a station (STA) mode. The AP mode is used for generating 802.11 beacon packets and the STA mode is used for receiving incoming beacon packets from other nodes 110, 112. The use of beacon packets is provided by way of example only. An artisan will recognize from the disclosure herein that the nodes 310, 312 may be configured to produce ping transmit events and ping receive events by transmitting messages between nodes without using beacon packets, or by producing beacon packets without operating in the AP and STA modes.

In AP mode, producing ping transmit events includes transmitting 802.11 beacon packets with transmit count stamps on a regular interval. For example, each node 310, 312 may transmit approximately 25 beacon packets per second. An artisan will recognize from the disclosure herein that in some embodiments substantially less than 25 beacon packets per second may be produced, and in other embodiments substantially more than 25 beacon packets per second may be produced. The particular number of beacon packets may depend on the particular application. Each beacon packet includes a hardware generated transmit count stamp (e.g., from the particular transmitting node's internal clock).

In STA mode, producing ping receive event includes, for each node 310, 312, receiving the beacon packets from the other nodes 310, 312 and associating receive count stamps to the corresponding ping transmit events. In certain embodiments, a time synchronization function (TFS) register latches when a beacon packet is received. Thus, a receive count stamp is read from the TSF register for each beacon packet that a particular node 310, 312 receives.

Each node 310, 312 aggregates the transmit count stamps that it receives and the receive count stamps that it produces and periodically sends this information in a pung message to one or more of the other nodes 310, 312 where location and timing solutions are computed. In one embodiment, for example, each node 310, 312 sends a pung message approximately every second. Other time intervals for sending pung messages, of course, may also be used depending on a particular application. In the example embodiment shown in FIG. 3, the pung messages are sent to an access point 310 (referred to herein as the master node 322) that includes a sorting module 318 and a space-time calibration unit (SCU) 320. In this example, the master node 322 is selected as the access point 310 that provides direct communication to the wired network 314 such that it is in regular communication with each of the other nodes 310, 312 in the WLAN 300.

The disclosure herein is not limited, however, to configuring the access point 310 that is in direct communication with the wired network 314 as the master node 322. Rather, any of the nodes 310, 312 may be selected as the master node 322. In addition, or in other embodiments, one or more of the functions of the master node 322 described may be distributed among a plurality of the nodes 310, 312 in the WLAN. For example, in one embodiment, each node 310, 312 may be configured to accumulate pung messages from the other nodes 310, 312 and to determine its own space-time solution. Further, in other embodiments, one or more of the functions of the master node 322 may be embodied in a separate device such as a server. For example, FIG. 3 illustrates that the sorting module 318 and/or the SCU 320 may optionally be located in a server 324 (shown in dashed lines) in communication with the WLAN through the wired network 314.

The sorting module 318 is configured to sort the aggregated pung data into pingcasts, and to sort the pingcasts into pingsets. A pingcast includes a transmit count stamp for a particular transmitting node 310, 312 and the corresponding receive count stamps produced by the other nodes 310, 312. For example, FIG. 4 graphically illustrates a table representing a pingcast 400 according to one embodiment. In this example, it is assumed that six nodes (e.g., Node 1, Node 2, Node 3, Node 4, Node 5, and Node 6) are in communication with one another. The pingcast 400 includes a transmit count stamp $Count_{TX1}$ generated by Node 1 upon producing a beacon packet. The pingcast also includes a receive count stamp for each of the other five nodes that received the beacon packet from Node 1. For example, Node 2 generates a receive count stamp $Count_{RX1,2}$ upon receiving the beacon packet from node 1, where the subscript "1.2" indicates that the beacon packet was transmitted from node 1 and received by node 2. As another example, Node 6 generates a receive count stamp Count$_{RX1.6}$ upon receiving the beacon packet from Node 1.

A pingset includes a set of pingcasts corresponding to each node 310, 312 transmitting a beacon packet. For example, FIG. 5 graphically illustrates a table representing a pingset 500 according to one embodiment. Returning to the six nodes in the above example, the corresponding pingset 500 includes a pingcast for Node 1, Node 2, Node 3, Node 4, Node 5, and Node 6, for a total of six pingcasts within the pingset 500. Thus, the pingset 500 includes the pingcast 400 discussed above in relation to FIG. 4.

Once the pung data is sorted into pingsets, the sorting module 318 computes differences between receive count stamps and transmit count stamps ($C_{RX}$–$C_{TX}$) for all of the ping events in the aggregated pingsets within a predetermined time period. By way of example only, and not by limitation, the sorting module 318 and the SCU 320 may compute solutions using data over a predetermined time period of approximately 4 seconds. Thus, if the transmit ping event rate is approximately 25 beacon packets per second, the sorting module 318 and the SCU 320 uses approximately 100 pingsets of data to determine space-time solutions for at least one of the nodes 310, 312 in the WLAN 300.

It has been observed that Wi-Fi radios corresponding to the access points 310 and mobile devices 312 are associated with transmit and receive delays, which tend to change over time. For some nodes 310, 312, a substantial portion of the delay is introduced on the receive side of the signal path. Thus, for example, when a beacon packet is received at a particular node's antenna (not shown), a certain number of clock counts transpire before the TSF register is latched. These delays, for example, may be on the order of approximately 800 microseconds. Thus, in certain embodiments, the sorting module 318 solves for and tracks these delays over time to thereby generate more precise positioning solutions.

The SCU 320 inputs the delays and the differences between the receive count stamps and the transmit count stamps provided by the sorting module 318 into the PhaseNet algorithms to determine a clock solution and a location solution for a particular mobile device 312 for each of the nodes 310, 312 in the WLAN 300. The master node 322 may provide a location to the particular mobile device 312 relative to the other nodes 310, 312. In some embodiments, the master node 322 provides a global location (e.g., based on latitude and longitude) to the particular mobile device 312. Such information may be based on a known global location (e.g., obtained using GPS) of at least one of the other nodes 310, 312 in the WLAN 300.

C. The PhaseNet Algorithms

The method used by the PhaseNet algorithms to determine the locations of nodes is pseudo lateration. In lateration, the distances (or differences of distances) between nodes, derived by time-of-flight measurements, are used to solve for positions of nodes. However, the PhaseNet algorithms invoke lateration as but one element of a more sophisticated structure. This is because PhaseNet synthesizes both timing and position information for each node of the network. These two elements, timing and position, are intertwined.

To determine the positions of the nodes of a network using pure lateration implies accurate timing information is available to make time-of-flight measurements. Conversely, to synchronize the clocks within a network by passing synchronization messages between nodes requires that node positions are known, so that time-of-flight delays may be subtracted out. The PhaseNet algorithms handle the linked nature of time and space by solving for both elements simultaneously.

In the most general case, the PhaseNet algorithms start with free-running clocks on each network node and, from these, synthesize a common network time and a relative location solution for the network. Before the PhaseNet algorithms are run, there may not be pre-existing timing relationship between nodes, and no concept of what a "network time" might be. The free-running counters are used to time stamp messages passed between nodes, and the resulting time stamps are then processed by the algorithms.

The PhaseNet algorithms are used to determine relative positions between the nodes. Subscripted K values may be used herein to account for direction between nodes. For example, the entity $k_{XYZ\_AB}=\{k_X, k_Y, k_Z\}$ may be referred to herein as the "coarse direction vector" existing between node A and node B, and the scalar components $k_X$, $k_Y$, and $k_Z$ may be referred to herein as "direction cosines" divided by c (the speed of light) of the coarse direction vector. The word "coarse" is used because strict direction is only asymptotically defined, and yet direction can be utilized nevertheless. In its strictest form, the coarse direction vector is simply the starting estimate on a convergence sequence, but for all practical purposes, a small percent error in the direction vectors is trivial compared to error analysis. One of the roles for the coarse direction vectors is to establish a Cartesian coordinate system such that motion can be resolved into orthogonal components that make sense to both the transmitting node and the receiving node (and eventually the entire set of nodes). In some embodiments, initial direction vectors may be used based on the last known relative positions of the sending and receiving nodes.

Figure 6:
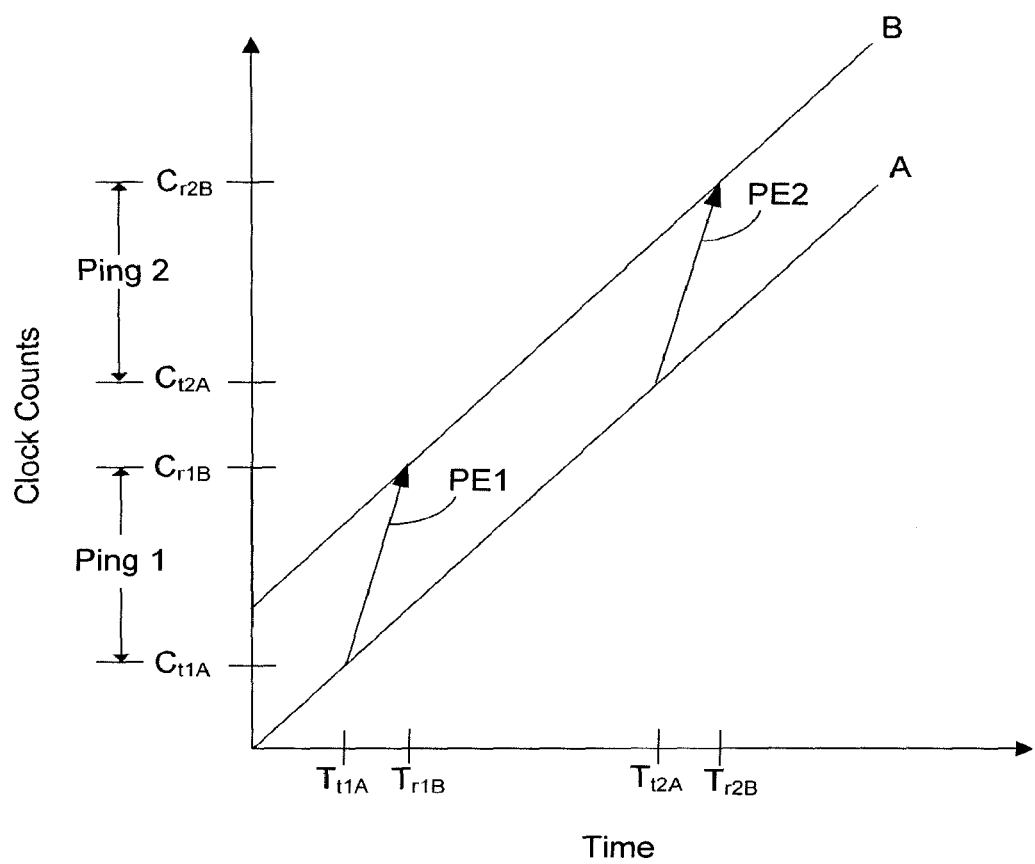
FIG. 6 is a graph showing clock counts corresponding to two time-displaced ping transmit events produced by a first node and received by a second node under conditions in which the nodes are the same distance apart from each other during the two ping transmit events.

FIG. 6 is a graph showing clock counts corresponding to two time-displaced ping events transmitted from node A and received by node B under conditions in which nodes A and B are the same distance apart from each other during two ping events. With reference to FIG. 6, a vector PE1 represents a first ping event, which has a clock count value, Ping 1, expressed as $$\text{Ping } 1 = C_{r1B} - C_{t1A}, \quad (1)$$

where $C_{t1A}$ is a clock count (or count stamp) accumulated by a counter (e.g., counter 214 shown in FIG. 2) driven by a digital clock residing at node A and transmitted by node A at a time, $T_{t1A}$, and $C_{r1B}$ is a clock count (or count stamp) accumulated by a counter driven by a digital clock residing at node B and associated with a time, $T_{r1B}$, at which node B receives the first ping transmit event produced by node A at $T_{t1A}$. A vector PE2 represents a second, later ping event, which has a clock count value, Ping 2, expressed as $$\text{Ping } 2 = C_{r2B} - C_{t2A}, \quad (2)$$

where $C_{t2A}$, is the clock count transmitted by node A at a time, $T_{t2A}$, and $C_{r2B}$ is the clock count associated with a time, $T_{r2B}$, at which node B receives the second ping transmit event produced by node A at $T_{t2A}$. The straight line (ignoring incremental count quantization) plot of clock counts as a function of time for each of nodes A and B indicates that their respective digital clocks, $CLK_A$ and $CLK_B$, operate at the same or a "system nominal" rate.

A differential clock count value representing the difference between Ping 2 and Ping 1, $\Delta\text{Ping}_{AB}$, can be expressed as $$\Delta \text{Ping}_{AB} = \text{Ping } 2 - \text{Ping } 1 \quad (3)$$
$$= (C_{r2B} - C_{t2A}) - (C_{r1B} - C_{t1A}).$$

The entity $\Delta\text{Ping}_{AB}=0$ when nodes A and B are the same distance apart from (i.e., not moving relative to) each other at the times of ping events PE1 and PE2. This is the situation represented in FIG. 6, in which $(T_{r1B}-T_{t1A})$ and $(T_{r2B}-T_{t2A})$ are equal.

Figure 7:
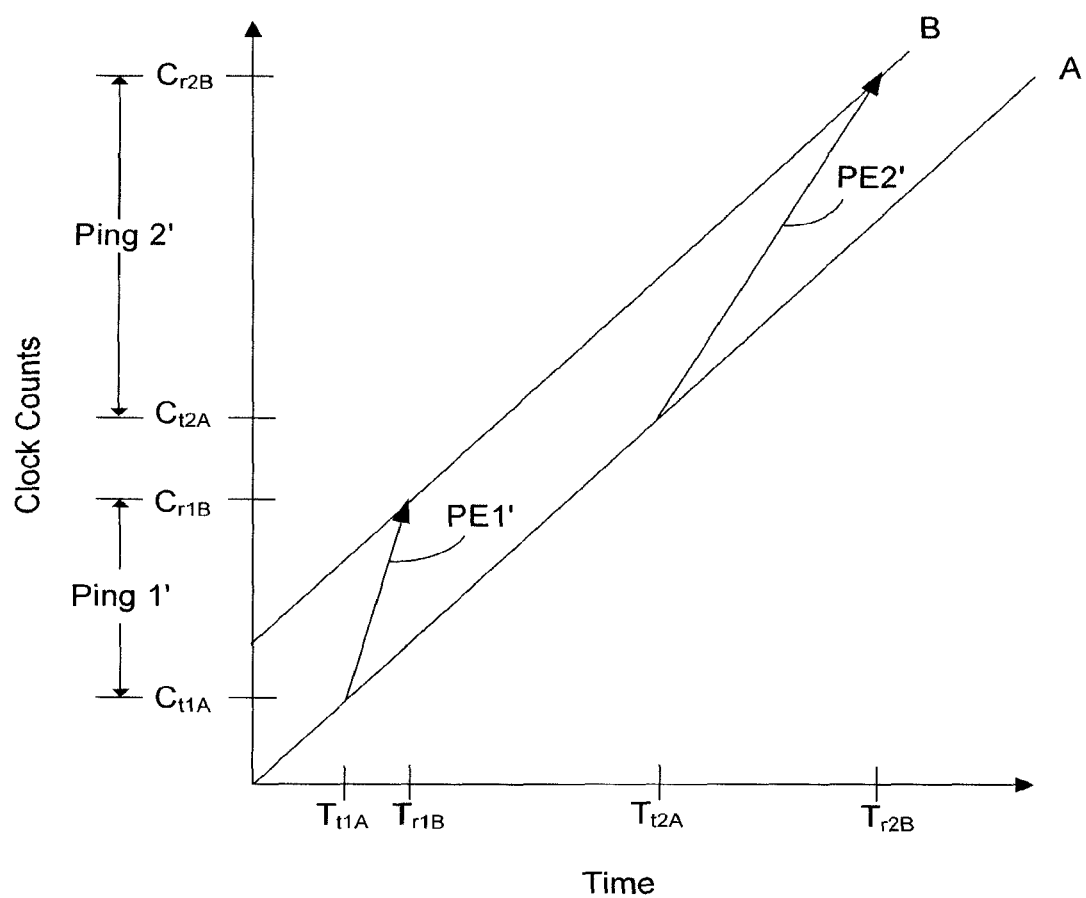
FIG. 7 is a graph showing clock counts corresponding to two time-displaced ping transmit events produced by a first node and received by a second node under conditions in which the nodes are different distances apart from each other during the two ping transmit events.

FIG. 7 is a graph showing clock counts corresponding to two time-displaced ping events transmitted from node A and received by node B under conditions in which nodes A and B are different distances apart from each other during the two ping events. With reference to FIG. 7, a vector PE1' represents a first ping event having a Ping 1' value that is the same as the Ping 1 value of vector PE1. A vector PE2' represents a second, later ping event having a Ping 2' value that is greater than the Ping 2 value of vector PE2. A change in distance between nodes A and B for the first and second ping events is expressed as $\Delta\text{Dist}_{AB}$. The inequalities $\Delta\text{Ping}_{AB}>0$ and $\Delta\text{Dist}_{AB}>0$ indicate that nodes A and B moved farther apart from each other between the times of the first and second ping events, as represented in FIG. 7. Similarly, the inequalities $\Delta\text{Ping}_{AB}<0$ and $\Delta\text{Dist}_{AB}<0$ indicate that nodes A and B moved closer to each other between the times of the first and second ping events.

Figure 8:
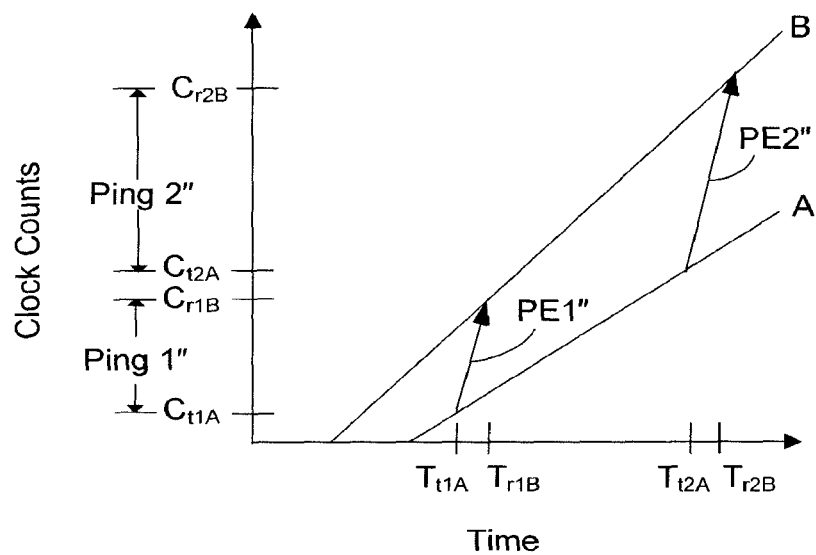
FIG. 8 is a graph showing clock counts corresponding to two time-displaced ping transmit events produced by a first node and received by a second node under conditions in which the nodes are the same distance apart from each other during the two ping transmit events but their clock rates are dissimilar.

FIG. 8 is a graph showing clock counts corresponding to two time-displaced ping events transmitted from node A and received by node B under conditions in which nodes A and B are the same distance apart from each other during the two ping events but their clock rates are dissimilar. With reference to FIG. 8, $(T_{r1B}-T_{t1A})$ and $(T_{r2B}-T_{t2A})$ are equal; therefore, nodes A and B are not moving relative to each other at the times of the first and second ping events PE1" and PE2". The clock count plots of nodes A and B indicate that they are not parallel and that the node A clock, $CLK_A$, counts at a slower rate than the count rate of the node B clock, $CLK_B$. FIG. 8 indicates that when the clock rate of $CLK_A$ decreases relative to the system nominal rate, Ping 2" increases relative to Ping 2 of FIG. 6. In general, the following relationships characterize in ping counts changes in rate of node clock A, $\Delta CLK_A$, and node clock B, $\Delta CLK_B$:

$\Delta CLK_A$ decreases $\Rightarrow \Delta\text{Ping}_{AB}$ increases $\Delta CLK_B$ decreases $\Rightarrow \Delta\text{Ping}_{AB}$ decreases.

The following two equations express, in terms of ping counts, changes in the distance between nodes A and B, assuming that ping events are also transmitted from node B and received and count stamped by node A:

$$\Delta\text{Ping}_{AB}=K_1\Delta\text{Dist}_{AB}-K_2\Delta CLK_A+K_3\Delta CLK_B \quad (4)$$

$$\Delta\text{Ping}_{BA}=K_1\Delta\text{Dist}_{BA}+K_2\Delta CLK_B-K_3\Delta CLK_A. \quad (5)$$

Figure 9:
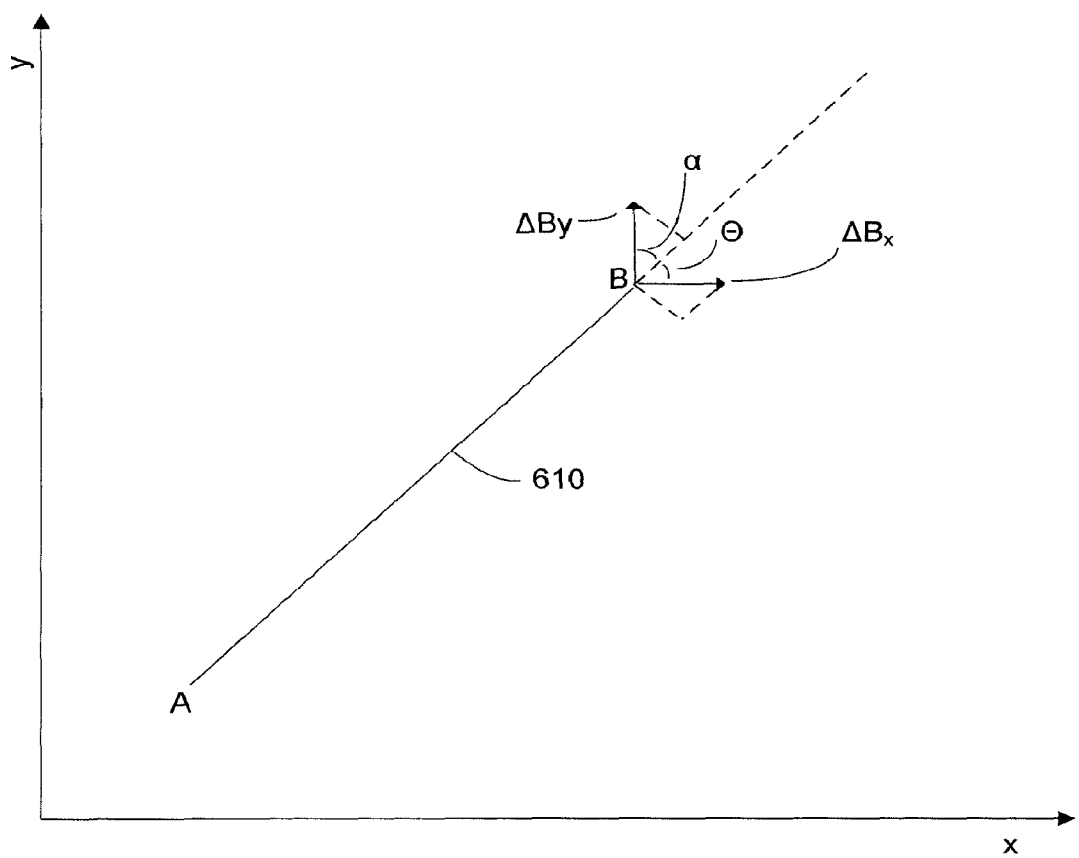
FIG. 9 is a diagram for use in illustrating the calculation of a change in distance between the first and second nodes.

FIG. 9 is a diagram for use in illustrating the calculation of $\Delta\text{Dist}_{AB}$. For small displacements during a unit ping interval (i.e., during a short interval between successive pings), the term $$\Delta\text{Dist}_{AB}=\sqrt{\Delta X_{AB}^2+\Delta Y_{AB}^2+\Delta Z_{AB}^2} \quad (6)$$

can be approximated. FIG. 9 is a diagram showing a straight line path segment between nodes A and B. With reference to FIG. 9, a straight line 910 connecting nodes A and B represents in x, y coordinate space the displacement of node B relative to node A for two successive ping events. FIG. 9 shows that, for short time intervals between successive ping events and when node A remains stationary, the x and y components of $\Delta\text{Dist}_{AB}$ at node B can be expressed as $\Delta B_x \cos\theta$ and $\Delta B_y \cos\alpha$, respectively, where $\Delta B_x$ and $\Delta B_y$ are the changes in the respective x and y coordinates of node B from its receipt of Ping 1 to its receipt of Ping 2, $\theta$ is the angle between line 910 and its projection onto the x axis, and $\alpha$ is the angle between line 910 and its projection onto the y axis.

Similarly, in x, y, z coordinate space, the z component of $\Delta\text{Dist}_{AB}$ can be expressed as $\Delta B_z \cos\phi$.

When the three components are combined and the coordinates of node A are included, $\Delta\text{Dist}_{AB}$ can be expressed as $$\Delta\text{Dist}_{AB} = \Delta B_x \cos\theta + \Delta B_y \cos\alpha + \Delta B_z \cos\varphi - [\Delta A_x \cos\theta + \Delta A_y \cos\alpha + \Delta A_z \cos\varphi]. \quad (7)$$

Substituting into equation (4) the expression for $\Delta\text{Dist}_{AB}$ in equation (7) and taking into account the speed of light, c, for the E-M implementation provides $$\Delta\text{Ping}_{AB} = \Delta B_x\left(\frac{\cos\theta}{c}\right) + \Delta B_y\left(\frac{\cos\alpha}{c}\right) + \Delta B_z\left(\frac{\cos\varphi}{c}\right) + \Delta A_x\left(\frac{-\cos\theta}{c}\right) + \Delta A_y\left(\frac{-\cos\alpha}{c}\right) + \Delta A_z\left(\frac{-\cos\varphi}{c}\right) - K_2\Delta CLK_A + K_3\Delta CLK_B. \quad (8)$$

Simplifying equation (8) by relabeling the constant coefficients of the terms of $\Delta\text{Dist}_{AB}$, $$\Delta\text{Ping}_{AB}=\Delta A_X K_{AX}+\Delta B_X K_{BX}+\Delta A_Y K_{AY}+\Delta B_Y K_{BY}+\Delta A_Z K_{AZ}+\Delta B_Z K_{BZ}-K_2\Delta CLK_A+K_3\Delta CLK_B. \quad (9)$$

Figure 10:
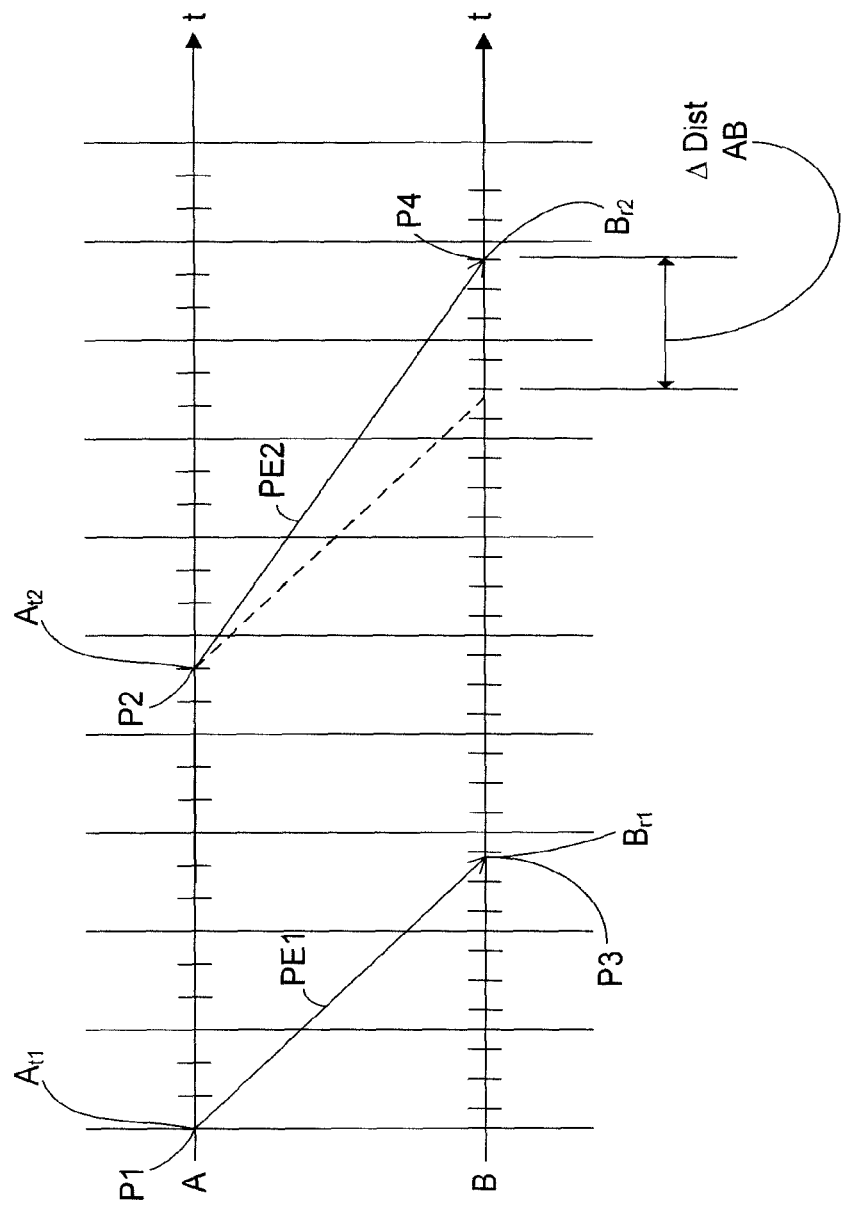
FIG. 10 is a diagram showing two timelines of ping transmit events produced by the first node and received by the second node for calculating changes in rates of the clocks of the first and second nodes.

The solution of the $\Delta CLK_A$ and $\Delta CLK_B$ terms is developed with reference to FIG. 10. In FIG. 10, the horizontal line A represents a timeline of ping transmit events produced by node A, and the horizontal line B represents a timeline of the ping receive events produced by node B. The vertical lines intersecting horizontal lines A and B are mutually spaced apart by a unit time interval, which represents the period of the system nominal clock rate. The shorter-length tick marks on lines A and B indicate the actual clock rates of $CLK_A$ and $CLK_B$, respectively. A vector PE1 represents a first ping event transmitted by a node A at a time $A_{t1}$ established by $CLK_A$ and received by node B at a time $B_{r1}$ established by $CLK_B$. A vector PE2 represents a second ping event transmitted by node A at a later time $A_{t2}$ established by $CLK_A$ and received by node B at a time $B_{r2}$ established by $CLK_B$. Transmit times $A_{t1}$ and $A_{t2}$ define respective time points $P_1$ and $P_2$, and receive times $B_{r1}$ and $B_{r2}$ define respective time points $P_3$ and $P_4$. Inspection of FIG. 10 reveals that $$\overline{P_1P_2}+\overline{P_2P_4}=\overline{P_1P_3}+\overline{P_3P_4}. \quad (10)$$

The term $\overline{P_1P_2}$ represents the time interval, measured in system nominal time, between the transmission of PE1 and the transmission of PE2. Similarly, the term $\overline{P_3P_4}$ represents the system nominal time interval between the reception times for these ping events. The terms $\overline{P_2P_4}$ and $\overline{P_1P_3}$ represent the system nominal time intervals between, respectively, the transmission and the reception of PE2 and PE1. More specifically, with reference to FIG. 9, $$\overline{P_1P_2}=(C_{t2A}-C_{t1A})-\Delta CLK_{A12} \quad (11)$$

$$\overline{P_3P_4}=(C_{r2B}-C_{r1B})-\Delta CLK_{B12}, \quad (12)$$

where $\Delta CLK_{A12}$ and $\Delta CLK_{B12}$ represent the number of clock ticks needed to correct to the system nominal clock rate for, respectively, $CLK_A$ from the transmission time of first ping event PE1 to the transmission time of second ping event PE2 and for $CLK_B$ from the receive time of PE1 to the receive time of PE2. Moreover, with reference to FIG. 10, $$\overline{P_1P_3} = \frac{Dist_{1AB}}{c} \quad (13)$$

and $$\overline{P_2P_4} = \frac{Dist_{2AB}}{c}, \quad (14)$$

where $Dist_{1AB}$ represents for the first ping event, PE1, the distance between nodes A and B from the transmit time recorded at node A to the receive time recorded at node B, and $Dist_{2AB}$ represents for the second ping event, PE2, the distance between nodes A and B from the transmit time recorded at node A to the receive time recorded at node B. Thus, equation (6) also can be expressed as $$\frac{\Delta Dist_{AB}}{c} = \frac{Dist_{2AB}}{c} - \frac{Dist_{1AB}}{c}. \quad (15)$$

Substituting into equation (10) the right-hand side terms of equations (11), (12), (13), and (14) provides the following expression $$(C_{t2A} - C_{t1A}) - \Delta CLK_{A12} + \frac{Dist_{2AB}}{c} = \quad (16)$$

$$\frac{Dist_{1AB}}{c} + (C_{t2B} - C_{t1B}) - \Delta CLK_{B12}.$$

Rearranging the terms of equation (10) provides $$-\Delta CLK_{A12} + \frac{Dist_{2AB}}{c} = \quad (17)$$

$$\frac{Dist_{1AB}}{c} + (C_{t2B} - C_{t2A} - C_{t1B} + C_{t1A}) - \Delta CLK_{B12}.$$

Substituting into equation (17) the left-hand side terms of equations (3) and (15) results in the following expression $$\Delta Ping_{AB} = \frac{\Delta Dist_{AB}}{c} + \Delta CLK_{B12} - \Delta CLK_{A12}, \quad (18)$$

where $\Delta CLK_{B12}$ and $\Delta CLK_{A12}$ represent corrections to, respectively, $CLK_B$ and $CLK_A$ to comport with the system nominal clock rate.

Equation (18) is in the form of the equation to which matrix algebra is applied to solve for the unknown displacement values and changes in clock rates. The matrix equation is expressed as $$g = Hf, \quad (19)$$

where g is a column vector of $\Delta$Pings, the number of which is the number of ping events minus 1; H is a two-dimensional matrix of coefficients constructed from the ping events; and f is a column vector of unknowns that include changes in clock rate and location changes in x, y, and z displacements.

Referring again to the example of ten nodes A, B, C, D, E, F, G, H, I, J shown in FIG. 1, each node listens to and records the other nine nodes' ping transmit events, yielding 9×10 or 90 ping events that are then recorded. Thus, in one embodiment, the g vector is organized in groups of 90, corresponding to roughly synchronous ping events of the 45 duplex channels existing among the ten nodes. In another embodiment, PhaseNet organizes the g vector in short snippets of information of a size equal to the length of a "harmonic block." In the example embodiment shown in FIG. 1, for example, this length is defined as 10 milliseconds or nominally 10 ping epochs for any given node. Many PhaseNet implementations may choose between 5 and 100 fundamental ping epochs per harmonic block, being a trade-off between, on the one hand, flexibility in dealing with different sampling rates on the chosen metrics, and on the other hand, inverting very large matrices. As computing resources continue to improve, the choice will slowly move beyond "100", as the pressure to worry about the size of matrices and the speed of inversions lessens.

The computation of equation (19) is carried out in certain embodiments using harmonic blocks, in which there is a selected number of harmonic blocks for each equation and selected numbers of clock solutions and location solutions for each harmonic block. The number of system nodes can change (above a certain minimum number of nodes), depending on whether certain nodes remain in the system.

Before equation (19) is solved, all of the ping information is accumulated by at least one node in the network. Each node uses a pung broadcasting schedule according to certain embodiments to transmit to other nodes in the network the ping information the node has received. By combining ping events and pungs that have been received, a node is able to reconstruct information for all of the ping events of the network.

In the example embodiment shown in FIG. 1, an entire harmonic block's worth of accumulated ping information is sent to a node's communication device 216 (see FIG. 2) for broadcast as a pung packet to all other nodes. Nodes receiving this pung-packet message (from at least one harmonic block time in the past) store the received pung data along with its own accumulated ping information. In this example, the pung data packet includes nine other nodes' received ping data. This configuration in which all participating nodes share all information is a baseline solution example, such that any node can create a full set-wide solution. Other embodiments may designate special nodes that capture all the pung packet data and thus have the full information set necessary to calculate set-wide solutions.

In the example embodiment shown in FIG. 1, a pung structure associated with one harmonic block should have 81 other-node ping information×10 ping events per block×2 bytes per ping data point or 1,620 bytes of information if no down-sampling or compression is used. This amounts to 18,000 bytes of pung information per channel per second, which may exceed the communication channel's capacity. In certain embodiments, only 3,600 bytes of accumulated ping data per second are stored, thus limiting the data transfer rate to 10 Kbps. Thus, in certain embodiments, PhaseNet reduces "Pung Overhead," the communications demand for the pung channel, to only a small percentage of a given channel's data carrying capacity. At the very least, the pung data rate is preferably below the channel capacity. Certain embodiments compress the pung data using standard algorithms known to those skilled in the art to reduce the burden on the communication channel.

D. Example Embodiment Illustrated with Pseudo-Code

Returning to the infrastructure embodiment discussed above in relation to FIG. 3, and with the general understanding of the PhaseNet algorithms provided above, the following examples use pseudo-code to describe how the sorting module 318 and the SCU 320 generate and solve equation (19) to determine the location of the nodes 310, 312 according to one embodiment. To simplify the discussion, these examples use either six nodes or three nodes where "node 1" is considered the master node. An artisan will recognize from the disclosure herein, however, that this example may be extended to include any number of nodes.

These examples include a first step of sorting the pung data accumulated from each node into groups or "sorties," which are analogous to the pingsets discussed above. This example also includes the steps of solving for basic clock parameters, providing for offset tracking and adjustment, and solving for location parameters. Each of these steps is discussed in detail below.

(1) Sorting the Pung Data into Groups or Sorties

In one embodiment, the sorting module 318 begins by determining a master origin, which is an arbitrary starting point for transmit ping events. When selecting the master origin, the sorting module 318 selects some time that is greater than the first recorded transmit ping event that the master node receives from another node. The sorting module 318 determines the master origin by finding, for each node, a transmission count stamp offset to another node (node "num") relative to an integer multiple of a parameter referred to as "PING_COUNT." A parameter referred to as "good_count" of the same measurement is received in order to declare that the offset is found. The sorting module 318 then determines a first instance at which each node other than node 1 (master node) records a transmit count stamp from node 1 that is at the correct offset. The sorting module 318 determines that a candidate master origin is acceptable if all of the nodes receive a chosen transmit ping event that node 1 sends out. In other words, each node has a record of the chosen transmit ping event in a respective "tx" registry. The sorting module 318 advances the candidate master origin, one ping count at a time, until this acceptable condition is reached. The sorting module 318 uses an array of pointers to keep track of when (at what index) each of the non-master origin nodes includes a record of the master origin transmission from node 1 in their registry.

The sorting module 318 then initializes a "sortie_order" array and a "sortie_tx" array. The sorting module 318 establishes the transmission time (offset) for all nodes other than the master node. The transmission time of node 1 of the master node is the master origin. There is no guarantee that each of the other nodes hears the node of interest's ping. The loop discussed below takes care of this problem provided that each of the nodes does indeed send out a ping over the frame and that at least one of the other nodes hears that ping. The sorting module 318 completes a first row of the sortie_order and sortie_tx arrays. The first position in the arrays is occupied by node 1 and the master origin, respectively. Given a list of transmit ping events for nodes 2-6, the sorting module 318 finds the first of these that node 1 hears. It should be noted that a receive time for nodet(1,:,3) monotonically increases. This node and its transmit count value comprise the second entry in the first sortie (first row of sortie_order and sortie_tx). The other four nodes then round out the rest of the sortie (positions 3-6). The sorting module 318 then rounds out a "ptr" array by checking to see when (at what index) a ping from the first node that received the master origin ping from node 1 (master node) is received by the master node. This information is put in the first index of the ptr array.

The sorting module 318 then constructs the sorties using all available pung data. This establishes an arbitrary starting point from which the SCU 320 can solve for and track the behavior of each clock. The clocks all run at distinct rates relative to a master clock (node 1 in this case). The clocks also have distinct phases or transmit time offsets with respect to the master clock. Further, each clock may have a different receive time delay, which is defined as the difference between the time that the receiving node records a transmit ping event received from another node and the time that the transmit ping event impinges upon the antenna of the receiving node. In one embodiment, the sorting module 318 first determines the transmission offsets of each node and then groups the transmissions and receptions of each node into time slots or sorties of size (number of nodes)×(number of nodes) and separated in time by PING_COUNT. As discussed below, once grouped, the SCU 320 creates a matrix equation encompassing a pre-determined time interval of data. The matrix is then inverted to solve for the delay and clock rate parameters. Implicit in the construction of the solution according to one embodiment is that the clock rate and the delay parameters are small compared with PING_COUNT.

The sorting module 318 performs a main processing loop to arrange the data in appropriate consecutive time slices. This process is not straightforward because the nodes can both misbehave and miss ping events, resulting in two types of error conditions. The first error condition is related to producing ping transmit events at times that deviate from expected transmit times relative to the master clock's expected transmit count. Given an initial transmit offset under normal operating conditions, each node produces ping transmit events at all times that are equal to that offset plus an integer multiple of the PING_COUNT. In practice, the nodes sometimes ping at times that deviate by less than one ping count from the expected value. Mathematically, this can be expressed as:

$$\text{Ping\_}tx(j)=tx\text{Off\_}0+j*\text{PING\_COUNT}+n(j) \quad (20)$$

The quantity n(j) is a pseudo-random noise value that is usually zero, but when non-zero its magnitude is usually less than PING_COUNT.

A second error condition occurs when a transmit ping event is transmitted from a node but it is not received by any of the other nodes; or (equivalently) when the transmitting node misses its transmission interval (e.g., it fails to transmit). This event is considered an erasure. Equation (20) can be updated as follows:

$$\text{Ping\_}tx(j)=(1-er(j))(tx\text{Off\_}0+j*\text{PING\_COUNT}+n(j)). \quad (21)$$

The quantity er(j) is a logical array that is set to 1 at locations where an erasure occurs. Otherwise it is set to 0. It should be noted that in the sorting module's main processing loop, any k for which |n(j)| is greater than a "valid_range" is considered an erasure.

When node k ("nodet(m,tmpn,1)") transmits at or close to the expected transmission time and node m hears the associated ping, the quantity $$\text{sortie\_}rxtx(j,k,m)=\text{node}t(m,tmpn,3)-\text{node}t(m,tmpn,2) \quad (22)$$

is a measure of node m's receipt time of a transmit ping event (according to node m's clock) minus node "k's" transmit time of that transmit ping event (according to node k's clock). In the event that node m does not hear a valid ping from nodet(m,tmpn,1), sortie_rxtx(j,k,m) is set to zero.

In this example, the array tmp_ptrs(k,m) is an (N+1)×N array, where N is the number of nodes. Row number indicates transmitting node and column number indicates receiving nodes. The (N+1)th row is used to guard against a rare condition discussed below. The array is used for advancing through the data for each node in a potentially irregular way due to the possible condition of missing data. The diagonal elements are used to indicate whether a ping from node k was heard (0 if not heard) and whether it was right on cue (set to 2) or off but within the "valid_range" (set to 1). An example entry in the array is tmp_ptr(1,2)=81, which indicates that the expected transmit ping event was received by node 2 from node 1 at position nodet(2,81,:). If row k is all zeros, none of the other nodes heard node k. A single zero in position (m,k) indicates that node m did not hear node k. An all zero column indicates that node m did not hear any other node's ping. The pointers ptr(m) are advanced to the next sortie position by taking the maximum index in each column and adding 1 to it. The (N+1)th row guards against the all zero column condition by taking the previous pointer position for each node and subtracting 1 from it.

The sorting module 318 determines the sortie transmission offsets. The offset for each node is used to put everything into a common reference frame with respect to the master clock when constructing the H matrix and solving for the f vector. For node 1, the offset is simply the difference between the time the node sent out its transmit ping event during frame j and the time it was supposed to do so. When the node number is any k>1, the offset is the difference between the time node 1 received a ping from node k and the time node 1 is supposed to send out a ping during frame j.

(2) Solving for Basic Clock Parameters

Once the sorting module 318 sorts the ping events (frames), the SCU begins by solving for the basic clock parameters of a particular mobile device 312 over an initial time interval. In this example, it is assumed that the particular mobile device remains stationary during the initial time interval. To this end, an H matrix and g vector are constructed and the H matrix is inverted. The clock parameters (f vector) that are solved include the delay terms for all nodes and the clock offsets of all nodes except the master node at the beginning and at the end of the chosen time interval. With regard to the delay terms, it is assumed that these are fixed over the course of data collection and that they represent the total delay between a first time at which a transmit ping event from a transmitting node arrives at the receiving node's antenna under ideal conditions and a second time at which a receive count stamp acknowledging that transmit ping event is generated at the receiving node. The clock offset terms are used to solve for the clock rate of each slave node relative to the master node. It is for this reason that the master node offset parameters are not solved in this example.

FIG. 11 graphically illustrates the H matrix structure 1100 when there are three nodes in the network and node1 is the master node according to one embodiment. The first column (labeled Row #), the second column (labeled Tx.Rx), and the first row are used for discussion purposes and are not part of the actual H matrix. A portion of the first row including the parameters D1, D2, D3, $Off2_0$, $Off2_N$, $Off3_0$, and $Off3_N$ may be considered a description of the f vector.

The second column (labeled Tx.Rx) is the transmitting node number that is followed by a period and then the receiving node number. There are no cases where the transmitting node number and the receiving node number are the same. The next three columns (respectively labeled D1, D2, and D3) are the delay coefficients for the three nodes. These coefficients are always either 0 or 1. A coefficient of 1 indicates that the current row of the H matrix is an equation in which the corresponding node is the receiving node. In one embodiment, the SCU 320 solves for a single constant delay term for each node over N consecutive frames. The next two columns (respectively labeled $Off2_0$ and $Off2_N$) include the offset coefficients for the second node. The first of these, $Off2_0$, is the offset at the beginning of the time interval and the second, $Off2_N$, is the offset at the end of the time interval (index N). The final two columns (respectively labeled $Off3_0$ and $Off3_N$) include the beginning and ending offset coefficients for the third node.

Unlike the delay terms, it is assumed that the clock offset terms are non-constant over the N sample interval. Moreover, as discussed below, a linear model is used in which the offset takes on the value $Offk_0$ at the beginning of the interval and $Offk_N$ at the end of the interval (time N), with all values in between represented as $$offk_0 + (n-1)*(offk_N - offk_0)/(N-1). \quad (23)$$

Each of the $dev_k[n]$ terms present in the last four columns represents a deviation from the expected transmission time at time slot n (the time at which the master node is supposed to transmit) of the transmitting node, as indexed by k. When node 1 is the transmitting node, the deviation is zero, except for more unusual cases when the node transmits slightly (a small fraction of PING_COUNT) off schedule. When the transmitting node is either node 2 or 3, the deviation is typically the difference between a time when node 1 usually receives a ping from the transmitting node and the expected transmission time of node 1. When the transmitting node's ping is off schedule it is manifest in an unusual receive count stamp of node 1 from the transmitting node. The purpose of including the addition of the described deviations is to carefully align the timing of all events to a master reference frame to achieve consistency in the set of linear equations.

The f vector structure may be determined from the foregoing description of the H matrix. For this example where there are three network nodes, the f vector includes three delay terms followed by four offset terms, representing clock offsets relative to the master node at the beginning and end of the time interval for nodes 2 and 3. Each g vector element is an ideal light-time corrected version of node m's receipt time of the transmit ping event (according to node m's clock) minus node k's transmit time of that transmit ping event (according to node k's clock). In pseudo equation form:

$$G[j] = rt\_tilda_{m,k}[n] = rt_{m,k}[n] - D_{m,k}/c, \quad (24)$$

$$j \in [1, (M-1)*M*N].$$

Thus, the equations to be solved may be in the form:

$$Delay_m + -(1-(n-1)/N - dev_k[n])*offset_{k,0} - ((n-1)/N - dev_k[n])$$

$$*offset_{k,N} + (1-(n-1)/N - dev_k[n])*offset_{m,0} - ((n-1)/N - dev_k[n])$$

$$*offset_{m,N} = rt_{m,k}[n] - D_{m,k}/c. \quad (25)$$

(3) Providing Offset Tracking and Adjustment

As discussed above, the SCU 320 solves for offsets at the beginning and end of a first predetermined time period. The SCU 320 uses these two values to construct a model of how the clock changes in each node relative to the system clock. That model is valid during the first predetermined time period where the two offsets were determined. When new data is received during other time periods, however, the model becomes less accurate. Thus, biases occur due to progressive deviations from the initial solution. Accordingly, in certain embodiments, the SCU 320 removes that bias from each subsequent block of data (a block of data being data that is acquired during a predetermined time period). In other words, the SCU 320 solves the space-time solution for the first period of time, applies the model to subsequent periods of time, and corrects for any overall bias errors introduced by the process.

The SCU 320 begins offset tracking and adjustment by processing over blocks of data, which are pre-determined time intervals of data. There are N sorties per block, where $$N = \text{sorties per second} * \text{blockTimeInterval}. \quad (26)$$

The SCU 320 then builds a model for the abscissa of each node starting with a 1 second time interval. The nodes ping at different times relative to one another. Thus, their x-axes are adjusted for the correct deviation (relative to the master clock) when computing the clock rate at any given point in time. The SCU 320 determines what the clock count is for the interval and for each transmitting node. The SCU 320 constructs a time ramp (timeramp=(0:N−1)/N*blockTimeInteval) and computes the block offset. Starting with the global offset, the block offset is the block number times the number of microseconds in the block. The SCU 320 adds to the global offset the relative offset of each node as referenced to the expected transmit time of the master node. The SCU 320 divides the result by 1e6 to get the offset time in seconds and then adds the result to the time ramp to get the offset for each sortie in the time interval.

The SCU 320 then computes the error between every measurement of $r_m - t_k$ and a corresponding estimated value between the same pair of nodes for all sorties in the block. The total number of calculations is K(K−1)N, where N is the number of sorties in the block and K is the number of nodes. The SCU 320 models the clock offset of each transmitting node using a linear offset model:

$$dzt_{n,k} = dzt\text{NomRate}_k * x_{n,k} + zt\text{NomOffset}_k(0), \quad (27)$$

where $X_{n,k}$ is the modified abscissa for each node as described above, and dzt_nominal_rate=offset$_k$(N)−offset$_k$(0)/(time_in_seconds). The offset terms are taken directly from the f vector.

The SCU 320 computes an estimate of the receive clock count of node m minus the transmit time count of node k over all sorties in the block j:

$$(r_m - t_k)_j = \text{delay}_m + \text{dist}_{m,k}/c - (k > 1) dzt_{k,j} + (m > 1) dzt_{m,j}. \quad (28)$$

Subtracting dzt for the transmitter and adding dzt for the receiver is performed for non-master node clocks to account for differences in clock rate and offset with respect to the master node. As a simple example, suppose the master node is transmitting to node 2 and further suppose that node 2's clock is running slower than that of the master node. In this case $r_2 - t_1$ will shrink with increasing j. Adding $dzt_2$, which is negative, will account for this behavior in the model.

The SCU 320 computes an error between the model and the observations:

$$\text{err}_{m,k,j} = (r_m - t_k)_j - (r_m - t_k)_j, \quad (29)$$

and removes all error values where "good pings" are not received. Note that the first version of the quantity on the right side of equation (29) (the italicized version) is the model term and the second version of the quantity (the non-italicized version) is the measured term.

Due to measurement imprecision of, and actual changes in, the differential clock rate of each non-master node with respect to the master node, the model of rx−tx for each pair of nodes slowly begins to drift from the measurements. The result is errors in the model of rx−tx for each pair of nodes having a non-zero mean or bias that increases with time. Because each of the M nodes is in duplex communication with the M−1 other nodes, the SCU 320 may solve a system of linear equations in order to estimate and substantially reduce the bias from each of the M−1 non-master nodes. This may also be thought of as projecting the error onto a subspace defined by offset bias vectors. The SCU 320 then removes the calculated bias from the average error terms for each tx/rx node pair. Looking at the duplex case between a pair of nodes, equation (29) is modified as follows:

$$\text{err}_{m,k,j} = \text{err}_{m,k,j} - b_m + b_k, \quad (30a)$$

$$\text{err}_{k,m,j} = \text{err}_{k,m,j} + b_m - b_k. \quad (30b)$$

Equation (30a) describes transmission from node m to node k and equation (30b) describes the reverse path. The terms $b_m$ and $b_k$ are the estimated bias terms for nodes m and k, respectively. If b or m is the master node, the associated bias term is zero.

At this point, the SCU 30 has accounted for and removed all contributions to the error from clock parameters. The remaining free variables include corrections to the x and y position of the particular mobile device 312. It may be helpful to think of the clock bias corrected error (equation (30)) as the difference between a previously known distance between two nodes and the current unknown position of one of the mobile devices 312. The SCU 320 determines a correction to the x and y position of the mobile device 312 that results in a smaller residual error.

The result of equation (30) when node m is a mobile node is the difference between the model of what rx minus tx is and the measurements. Taking the average of this measurement over a block of data (j=1:N) results in information regarding the change in the mobile device's distance to node k. Because the model uses the original position of the mobile device 312 and the measurement incorporates its actual position, this difference can be expressed as $$\Sigma_{j=1}^{N} \text{err}_{j,k,m} = N*(d_0 - d_{k,m} + \text{Noise}), \quad (31a)$$

$$\Sigma_{j=1}^{N} \text{err}_{j,m,k} = N*(d_0 - d_{k,m} + \text{Noise}), \quad (31b)$$

where $d_0$ is a previous distance between node 1 and node m and $d_{k,m}$ is its current unknown position. The noise term encompasses any additional discrepancy that is not accounted for in the model.

For the fixed nodes, as indexed by k, the SCU 320 performs the following process:

i. Calculate two current distance estimates between the mobile device 312 and node k. Each of these distance estimates is obtained by subtracting equation (31a) and equation (31b) (divided by N) from a previous distance, $d_0$ (known or estimated), between the mobile device 312 and the fixed node. It is observed that the result of this operation is $d_{k,m}$−noise. Repeat this operation for the k (fixed nodes) in the network. Call these values $\text{ndf}_k$ and $\text{ndr}_k$, where "$\text{ndf}_k$" refers to transmission from node k to the mobile and "$\text{ndr}_k$" refers to transmission from the mobile to node k.

ii. Using the previous estimate of the mobile device's position, systematically introduce perturbations to its position (x and y coordinates) and re-calculate the distance to the fixed nodes. Call these values $d_{k,i}$, where k references node number and i references iteration number.

iii. Calculate the objective function for this iteration, i.

$$err_i = \sum_{k=1}^{K} (ndr - d)^2 + (ndf - d)^2, \quad (32)$$

iv. If $err_i < err_{i-1}$, repeat steps ii-iv with a new position perturbation. Otherwise, use the position estimate that yielded $err_{i-1}$.

v. Guidelines for perturbing: the error surface is generally quite smooth. So a gradient descent procedure works well. In other words, if changing the position in a specific direction results in decreased error for a given iteration, the position may be perturbed in the same direction for the next iteration.

E. Example Wi-Fi Embodiments Using Ad Hoc Mode

Figure 12:
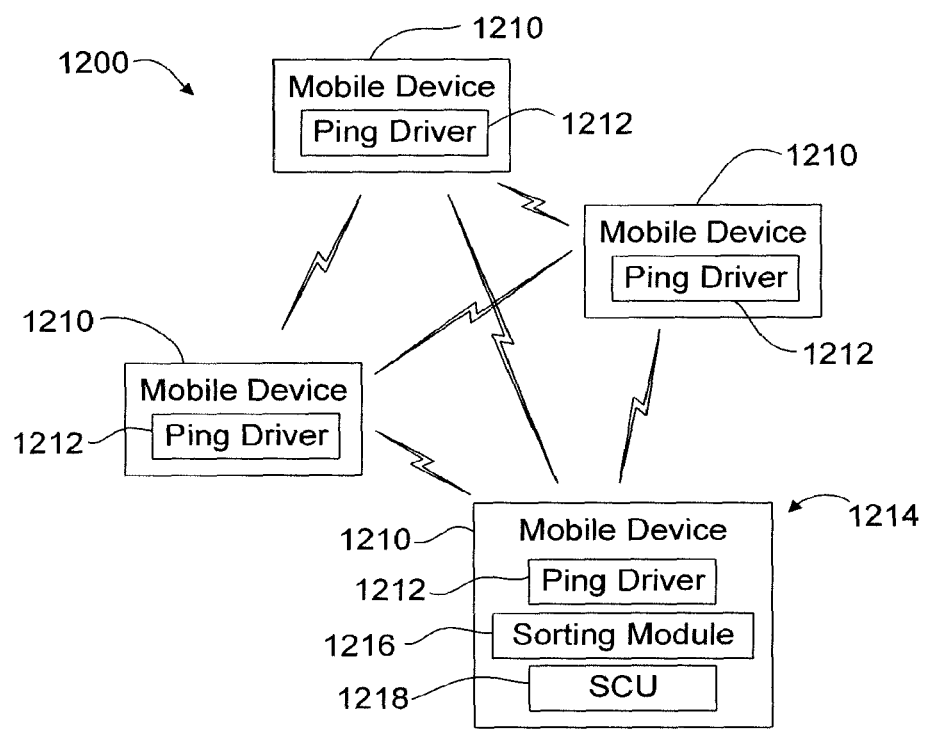
FIG. 12 is a block diagram of a WLAN operating in an Ad Hoc mode according to one embodiment.

As discussed above, the IEEE 802.11 standard provides for both infrastructure and Ad Hoc modes. In Ad Hoc mode, the wireless devices communicate with each other directly. For example, FIG. 12 is a block diagram of a WLAN 1200 operating in an Ad Hoc mode according to one embodiment. The WLAN 1200 includes four mobile devices 1210 (also referred to as nodes 1210) in direct wireless communication with one another. An artisan will recognize from the disclosure herein that any number of mobile devices 1210 may be used. Further, while the nodes 1210 are referred to as being mobile, an artisan will understand from the disclosure herein that one or more of the nodes 1210 may be at a fixed location. For example, in one embodiment, the systems and methods disclosed herein are configured to determine the location of a mobile node in relation to a plurality of fixed nodes.

As with the example infrastructure embodiments discussed above, each of the nodes 1210 includes a ping driver 1212 for producing ping transmit events and ping receive events. Unlike the embodiments discussed above, however, the ping drivers 1212 do not use beacon packets to produce ping events. Rather, the ping drivers 1212 produce ping transmit events by exchanging user datagram protocol (UDP) packets with transmit count stamps between the nodes 1210. Accordingly, the ping drivers 1212 produce ping receive events by receiving UDP packets from other nodes 1210 and associating receive count stamps to the corresponding ping transmit events.

Each node 1210 aggregates the transmit count stamps that it receives and the receive count stamps that it produces and periodically sends this information in a pung message to one or more of the other nodes 1210 where location and timing solutions are computed. In the example embodiment shown in FIG. 12, the pung messages are sent to a master node 1214 that includes a sorting module 1216 and an SCU 1218. As discussed above, in other embodiments, each node 1210 may include a respective sorting module 1216 and/or an SCU 1218. In addition, or in other embodiments, the functions of the sorting module 1216 and/or the SCU 1218 may be distributed among a plurality of the nodes 1210. In another embodiment, a server (not shown) may perform one or more of the functions of the sorting module 1216 and/or the SCU 1218. Further, a controller (not shown) or the master node 1214 may be configured to coordinate between the nodes 1210 and/or the server.

In certain embodiments, the sorting module 1216 performs the functions described above for the sorting module 318 of FIG. 3, and the SCU 1218 performs the functions described above for the SCU 320 of FIG. 3. The sorting module 1216 and the SCU 1218 are modified as described herein, however, to accommodate the less-periodic nature of the pung data that results when beacon packets are not used for ping events.

In an example embodiment described below, the nodes 1210 include GS-1010 TLS "system-on-a-chip" wireless devices available from GainSpan Corporation of Los Gatos, Calif. In this example embodiment, the GainSpan GS-1010 TLS devices are modified to include the ping driver 1212 to transmit and receive count stamps as UDP packets. In addition, or in other embodiments, the GainSpan GS-1010 TLS devices are modified to provide transmit and receive count stamps with resolutions of approximately +/−50 nanoseconds. As shown in FIG. 12, at least one of the GainSpan GS-1010 TLS devices is also modified to include the sorting module 1216 and the SCU 1218. Other devices may also be used, however, such as W24 Wi-Fi modules available from Motorola of Schaumburg, Ill., or any other 802.11 capable devices that provide low level, high resolution count stamping capabilities.

In one embodiment, the WLAN 1200 operates as a deterministic state machine. On startup, the master node 1214 (or a separate controller) creates the Ad Hoc network using a pre-determined service set identifier (SSID) that is expected by the nodes 1210 and queries the nodes 1210 for their status. Each node 1210 discovers the Ad Hoc network using the predetermined SSID, performs initialization steps, and enters a "listen" state. The various states of the nodes 1210 are described in more detail below. In the listen state, each node 1210 "hears" the request for status from the master node 1214, and responds with an indication that it is ready and has joined the network.

After initialization of the Ad Hoc network, the master node 1214 sequentially instructs each node 1210 to enter a "transmit pings" state to broadcast N transmit ping events to the other nodes 1210. Each node 1210 records the transmit count stamps of each transmit ping event that it broadcasts. Each listening nodes 1210, upon detecting the incoming transmit ping events, generates receive count stamps associated with each transmit ping event. For each ping receive event, the listening node records the respective transmitting node, packet number, and receive count stamp. Periodically (e.g., after each node 1210 has had a turn producing a ping transmit event), the master node 1214 requests that each node 1210 return the data that it has recorded as pung messages.

Figure 13:
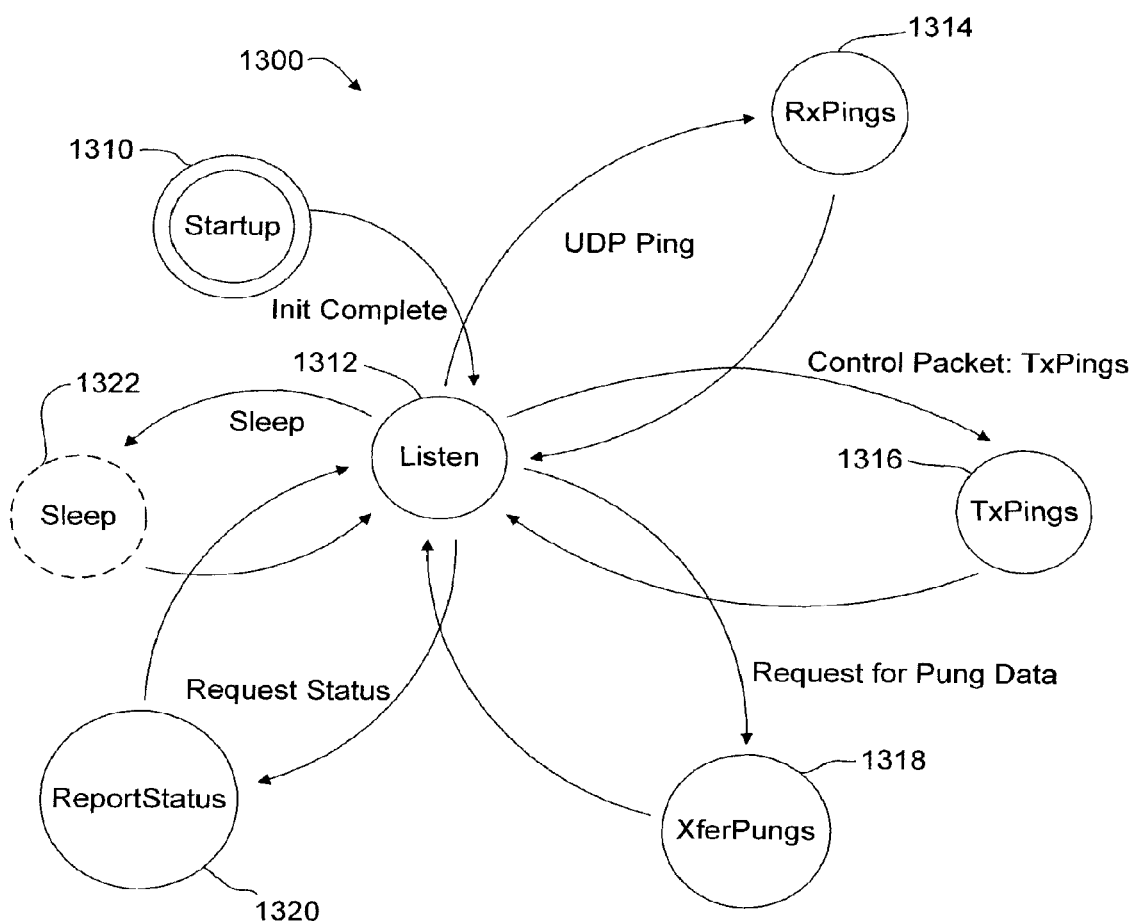
FIG. 13 graphically illustrates a state diagram model for the nodes shown in FIG. 12 according to one embodiment.

FIG. 13 graphically illustrates a state diagram model 1300 for the nodes 1210 shown in FIG. 12 according to one embodiment. The state diagram model 1300 includes a startup state 1310, a listen state 1312, a receive ping (RxPings) state 1314, a transfer ping (TxPings) state 1316, a transfer pung data (XferPungs) state 1318, a report status state 1320, an error state (not shown), and a sleep state 1322. An artisan will understand from the disclosure herein that not every embodiment will include each of these states and that the functions performed by the various states may be combined and/or modified for a particular application. In this example, transactions between nodes 1210, and state transitions within a node 1210, are triggered by commands from the master node 1214 (or a controller). In other embodiments, however, the system is less deterministic and individual nodes 1210 exercise more control over their own processes.

In the startup state 1310, the network 1200 performs initialization, which may include establishing communications with the Ad Hoc network, the master node 1214, a server (not shown), and/or a controller (not shown). In one embodiment, the nodes 1210 have fixed IP addresses, are on a common subnet, and a DHCP server is not used. The master node 1214 (or controller) knows the number of nodes and their static IP address. In addition, the nodes 1210 know the IP address of the master node 1214 (or controller) such that they do not they do not need to know the address of the other nodes 1210. When initialization is complete (Init Complete), the network 1200 moves from the startup state 1310 to the listen state 1312. In one embodiment, nodes 1210 are not allowed to leave or join the network 1200 after the initial startup state 1310 and node registration steps are complete. In other embodiments, however, nodes 1210 may join and leave the network 1200 at any time.

When a particular node 1210 is in the listen state 1312, the node 1210 listens for UDP packets that include ping transmit events (UDP ping). The node 1210 may also listen for instructions from the master node 1214.

Upon receiving a UDP ping from another node while in the listen state 1312, the node 1210 enters the receive ping state 1314. In this state, the ping driver 1212 captures the UDP packet contents, records the receive count stamp, and stores the appropriate information discussed above in the node's pung table. The node 1210 then returns to the listen state 1312.

Upon receiving a control packet from the master node 1214 while in the listen state 1312, which control packet commands the node 1214 to produce broadcast ping events, the node 1210 enters the transmit ping state 1316. In this state, the ping driver 1212 broadcasts a series of transmit ping events to the other nodes 1200 using UDP packets. In other embodiments, the node 1210 may enter this state periodically without being commanded to do so by the master node 1214. After producing the transmit ping events, the node 1210 returns to the listen state 1312.

Upon receiving a control packet from the master node 1214 while in the listen state 1213, which control packet requests pung data, the node 1210 enters the transfer pung data state 1318. In this state, the ping driver 1212 transfers the pung data it has accumulated to the master node 1214 (or server). In other embodiments, the node 1210 may transition to this state periodically without being commanded to do so by the master node 1214. After transferring the pung data, the node 1210 returns to the listen state 1312.

Upon receiving a control packet from the master node 1214 while in the listen state 1312, which control packet requests status, the node 1210 enters the report status state 1320. In this state, the node 1210 provides diagnostic information to the master node 1214. For example, the node 1210 may report errors to the master node 1214. After reporting the status, the node 1210 returns to the listen state 1312. As mentioned above, the node 1210 may enter an error state (not shown) from any of the other states when an unrecoverable error occurs. While in a diagnostic mode, the node 1210 may enter the error state when any error occurs. In the error state, the node 1210 will wait for a status request from the master node 1214, or a command to attempt to re-start (e.g., by re-entering the startup state 1310).

Upon receiving a control packet from the master node 1214 while in the listen state 1312, which control packet commands entry into the sleep state 1322, the node 1210 enters the sleep state 1322. In addition, or in other embodiments, the node 1210 may enter the sleep state 1322 during periods of inactivity without being commanded to do so by the master node 1214. The sleep state 1322 is a power savings state and is included in the state diagram 1300 to reduce power consumption (and enhance battery life). In one embodiment, entering the sleep state 1322 includes receiving a command from the master node 1322 to enter a low-power, sleep state (e.g., a "standby" state in the GS-1010 TLS device) for a specified period of time (e.g., N minutes), after which the node 1210 awakens and returns to the listen state 1312.

It will be understood to those having skill in the art that many changes may be made to the details of the above-described embodiments without departing from the underlying principles of the invention. The scope of the present invention should, therefore, be determined only by the following claims.

The invention claimed is:

1. A method for determining location and timing information of one or more nodes in a wireless local area network (WLAN), the method comprising:
generating ping event values corresponding to ping events related to transmit count stamps and receive count stamps for wireless messages exchanged between nodes in the WLAN;
sorting the ping event values corresponding to multiple ones of the ping events that occur within a first predetermined time period;
for ping event values within the first predetermined time period, producing differences between the respective receive count stamps and the transmit count stamps for each wireless message, and generating transmit offset values; and
generating, from the produced differences and the transmit offset values, a clock rate solution and a location solution for at least one of the nodes in the WLAN.

2. The method of claim 1, wherein each node includes a receive delay corresponding to a difference between a first time at which the node records a receive count stamp corresponding to a particular wireless message and a second time at which the particular wireless message is received at an antenna of the receiving node, wherein generating the clock rate solution and the location solution further comprises:
generating receive delay values, based on the produced differences and the transmit offset values, relating to the receive delays for each of the nodes.

3. The method of claim 2, wherein generating the transmit offset values comprises, for each ping event within the first predetermined time period:
determining a first transmit offset value at a beginning of the first predetermined time period; and
determining a second transmit offset value at an end of the first predetermined time period.

4. The method of claim 3, further comprising:
for each node, generating a model of the transmit offset values based on the corresponding first transmit offset values and the corresponding second transmit offset values in the first predetermined time period;
determining observed differences between the receive count stamps and corresponding transmit count stamps for the ping events that occur during a second predetermined time period after the first predetermined time period;
determining errors between the observed differences and corresponding estimated differences for the ping events that occur during the second predetermined time period, the estimated differences being based on the model for each node;
based on the determined errors, generating an average error for each pair of transmitting nodes and receiving nodes;
for each pair of transmitting nodes and receiving nodes, generating a reference clock offset as a difference between the transmit offset values from the model in the first predetermined time period and an estimate of offset values obtained in the second predetermined time period; and
for each pair of transmitting nodes and receiving nodes with a ping event that occurs during the first predetermined period of time, removing the generated reference clock offset values from the average error.

5. The method of claim 4, wherein generating the location solution comprises:
based on an initial estimate of the at least one node's position, determining the location solution using a search algorithm to minimize the average error.

6. The method of claim 1, wherein generating the ping event values comprises:
generating, at a transmitting node, a beacon packet that includes a corresponding transmit count stamp;
upon receiving the beacon packet at a receiving node, latching a register; and
determining a corresponding receive count stamp from the latched register.

7. The method of claim 6, wherein generating and receiving the beacon packet comprises:
operating each node simultaneously in an access point mode and a station mode, wherein each node transmits beacon packets in the access point mode and detects other beacon packets in the station mode.

8. The method of claim 1, wherein generating the ping event values comprises:
generating, at a transmitting node, a user datagram protocol (UDP) packet that include a corresponding transmit count stamp; and
upon receiving the UDP packet at a receiving node, associating the transmit count stamp with a receive count stamp.

9. The method of claim 1, wherein sorting the ping event values comprises:
grouping the ping event values into pingcasts corresponding to each wireless message, each pingcast comprising a transmit count stamp produced by a node that transmitted the wireless message and plurality of receive count stamps produced by each node that received the wireless message; and
grouping the pingcasts into pingsets, each pingset comprising a pingcast corresponding to a node that transmits a wireless message.

10. A system for determining location and timing information in a wireless local area network (WLAN), the system comprising:
a plurality of nodes to communicate wirelessly through the WLAN, each node comprising a respective ping driver to generate ping event values corresponding to ping events related to transmit count stamps and receive count stamps for wireless messages exchanged between the nodes in the WLAN;
a sorting module to:
sort the ping event values corresponding to multiple ones of the ping events that occur within a first predetermined time period;
based on the sorted ping event values, produce differences between the respective receive count stamps and the transmit count stamps for each wireless message; and
based on the sorted ping event values, generate transmit offset values; and
a space-time calibration unit to generate, from the produced differences and the transmit offset values, a clock rate solution and a location solution for at least one of the nodes in the WLAN.

11. The system of claim 10, wherein each node includes a receive delay corresponding to a difference between a first time at which the node records a receive count stamp corresponding to a particular wireless message and a second time at which the particular wireless message is received at an antenna of the receiving node, wherein the space-time calibration unit is configured to generate the clock rate solution and the location solution by generating receive delay values, based on the produced differences and the transmit offset values, relating to the receive delays for each of the nodes.

12. The system of claim 11, wherein, for each ping event within the first predetermined time period, the sorting module is further configured to:
determine a first transmit offset value at a beginning of the first predetermined time period; and
determine a second transmit offset value at an end of the first predetermined time period.

13. The system of claim 12, wherein the space-time calibration unit is further configured to:
for each node, generate a model of the transmit offset values based on the corresponding first transmit offset values and the corresponding second transmit offset values in the first predetermined time period;
determine observed differences between the receive count stamps and corresponding transmit count stamps for the ping events that occur during a second predetermined time period after the first predetermined time period;
determine errors between the observed differences and corresponding estimated differences for the ping events that occur during the second predetermined time period, the estimated differences being based on the model for each node;
based on the determined errors, generate an average error for each pair of transmitting nodes and receiving nodes;
for each pair of transmitting nodes and receiving nodes, generate a reference clock offset as a difference between the transmit offset values from the model in the first predetermined time period and an estimate of offset values obtained in the second predetermined time period; and
for each pair of transmitting nodes and receiving nodes with a ping event that occurs during the first predetermined period of time, remove the generated reference clock offset values from the average error.

14. The system of claim 13, wherein the space-time calibration unit is configured to generate the location solution by:
based on an initial estimate of the at least one node's position, determining the location solution using a search algorithm to minimize the average error.

15. The system of claim 10, wherein each ping driver is configured to:
generate, at a transmitting node, a beacon packet that includes a corresponding transmit count stamp;
upon receiving the beacon packet at a receiving node, latch a register; and
determine a corresponding receive count stamp from the latched register.

16. The system of claim 15, wherein each ping driver is further configured to:
operate each node simultaneously in an access point mode and a station mode, wherein each node transmits beacon packets in the access point mode and detects other beacon packets in the station mode.

17. The system of claim 10, wherein each ping driver is further configured to:
generate, at a transmitting node, a user datagram protocol (UDP) packet that include a corresponding transmit count stamp; and
upon receiving the UDP packet at a receiving node, associate the transmit count stamp with a receive count stamp.

18. The system of claim 10, wherein the sorting module is configured to:

group the ping event values into pingcasts corresponding to each wireless message, each pingcast comprising a transmit count stamp produced by a node that transmitted the wireless message and plurality of receive count stamps produced by each node that received the wireless message; and group the pingcasts into pingsets, each pingset comprising a pingcast corresponding to a node that transmits a wireless message.

* * * * *